United States Patent
Coleman et al.

(10) Patent No.: US 7,606,314 B2
(45) Date of Patent: Oct. 20, 2009

(54) METHOD AND APPARATUS FOR CACHING, COMPRESSING AND TRANSMITTING VIDEO SIGNALS

(75) Inventors: Scott Coleman, Fairfax, VA (US); Swen Anderson, Burgstüdt (DE)

(73) Assignee: Raritan America, Inc., Somerset, NJ (US)

( * ) Notice: Subject to any disclaimer, the term of this patent is extended or adjusted under 35 U.S.C. 154(b) by 1104 days.

(21) Appl. No.: 10/898,001

(22) Filed: Jul. 22, 2004

(65) Prior Publication Data
US 2005/0105608 A1    May 19, 2005

Related U.S. Application Data

(63) Continuation-in-part of application No. 10/233,299, filed on Aug. 29, 2002.

(51) Int. Cl.
*H04N 7/18* (2006.01)
(52) U.S. Cl. .............................. 375/240.27; 375/240.26
(58) Field of Classification Search ................................
375/240.01–240.29; 348/715–719
See application file for complete search history.

(56) References Cited

U.S. PATENT DOCUMENTS

| | | | |
|---|---|---|---|
| 4,698,672 A | 10/1987 | Chen et al. |
| 4,771,865 A | 9/1988 | Hinderling |
| 5,008,747 A | 4/1991 | Carr et al. |
| 5,483,634 A | 1/1996 | Hasegawa |
| 5,552,832 A | 9/1996 | Astle |
| 5,576,845 A | 11/1996 | Komatsu |
| 5,721,842 A | 2/1998 | Beasley et al. |
| 5,732,212 A | 3/1998 | Perholtz et al. |
| 5,742,274 A | 4/1998 | Henry et al. |
| 5,757,424 A | 5/1998 | Frederick |
| 5,767,897 A | 6/1998 | Howell |
| 5,802,213 A | 9/1998 | Gardos |
| 5,821,986 A | 10/1998 | Yuan et al. |
| 5,861,960 A | 1/1999 | Suzuki et al. |
| 5,884,096 A | 3/1999 | Beasley et al. |
| 5,937,176 A | 8/1999 | Beasley et al. |

(Continued)

FOREIGN PATENT DOCUMENTS

WO   WO 2005/055582   6/2005

OTHER PUBLICATIONS

The International Search Report and Written Opinion for PCT/US04/29899 dated Aug. 31, 2006.

(Continued)

*Primary Examiner*—Andy S Rao

(57) ABSTRACT

Disclosed is a method and apparatus for transmitting video signals from a remote computer to a local computer over a network such as a LAN, WAN, the Internet, etc. The method receives and digitizes signals from the remote computer, conditions the signals, and compresses the signals for efficient transmission over the network connection. The method and apparatus also utilizes a cache of recently transmitted video to further decrease the data needed for transmission of the signals. The conditioning and caching use frame buffers of video signals that are divided into cells to reduce noise in the image, and to limit the portions of the video signals that must be transmitted. The present invention maybe used in conjunction with a keyboard video mouse switch to enable a user at the local computer to select one of a number of remote devices for remote operation.

21 Claims, 15 Drawing Sheets

U.S. PATENT DOCUMENTS

| | | | |
|---|---|---|---|
| 6,016,166 | A | 1/2000 | Huang et al. |
| 6,091,857 | A | 7/2000 | Shaw et al. |
| 6,112,264 | A | 8/2000 | Beasley et al. |
| 6,167,432 | A | 12/2000 | Jiang |
| 6,173,082 | B1 | 1/2001 | Ishida et al. |
| 6,263,365 | B1 | 7/2001 | Scherpbier |
| 6,289,378 | B1 | 9/2001 | Meyer et al. |
| 6,304,895 | B1 | 10/2001 | Schneider et al. |
| 6,330,595 | B1 | 12/2001 | Ullman et al. |
| 6,333,750 | B1 | 12/2001 | Odryna et al. |
| 6,343,313 | B1 | 1/2002 | Salesky et al. |
| 6,345,323 | B1 | 2/2002 | Beasley et al. |
| 6,363,062 | B1 | 3/2002 | Aaronson |
| 6,373,850 | B1 | 4/2002 | Lecourtier et al. |
| 6,388,658 | B1 | 5/2002 | Ahern et al. |
| 6,408,334 | B1 | 6/2002 | Bassman et al. |
| 6,445,818 | B1 | 9/2002 | Kim |
| 6,532,218 | B1 | 3/2003 | Shaffer et al. |
| 6,535,983 | B1 | 3/2003 | McCormack |
| 6,539,418 | B2 | 3/2003 | Schneider et al. |
| 6,567,813 | B1 | 5/2003 | Zhu et al. |
| 6,567,869 | B2 | 5/2003 | Shirley |
| 6,571,016 | B1 | 5/2003 | Mehrotra et al. |
| 6,621,413 | B1 | 9/2003 | Roman et al. |
| 6,622,018 | B1 | 9/2003 | Erekson |
| 6,664,969 | B1 * | 12/2003 | Emerson et al. ............ 345/544 |
| 6,675,174 | B1 * | 1/2004 | Bolle et al. ............ 707/104.1 |
| 6,701,380 | B2 | 3/2004 | Schneider et al. |
| 6,728,753 | B1 | 4/2004 | Parasnis et al. |
| 6,771,213 | B2 | 8/2004 | Durst |
| 6,772,169 | B2 | 8/2004 | Kaplan |
| 6,850,502 | B1 | 2/2005 | Kagan |
| 6,952,495 | B1 | 10/2005 | Lee |
| 7,024,474 | B2 | 4/2006 | Clubb |
| 7,042,587 | B2 * | 5/2006 | Fiske ....................... 358/1.15 |
| 7,099,934 | B1 | 8/2006 | Ewing et al. |
| 7,117,266 | B2 | 10/2006 | Fishman et al. |
| 7,249,167 | B1 | 7/2007 | Liaw |
| 7,260,624 | B2 | 8/2007 | Sivertsen |
| 2002/0038334 | A1 | 3/2002 | Schneider et al. |
| 2002/0095594 | A1 | 7/2002 | Dellmo |
| 2002/0147840 | A1 | 10/2002 | Mutton et al. |
| 2003/0017826 | A1 | 1/2003 | Fishman et al. |
| 2003/0030660 | A1 | 2/2003 | Dischert et al. |
| 2003/0037130 | A1 | 2/2003 | Rollins |
| 2003/0088655 | A1 | 5/2003 | Leigh |
| 2003/0092437 | A1 | 5/2003 | Nowlin et al. |
| 2003/0112467 | A1 | 6/2003 | McCollum et al. |
| 2003/0135656 | A1 | 7/2003 | Schneider et al. |
| 2003/0217123 | A1 | 11/2003 | Anderson |
| 2004/0045030 | A1 | 3/2004 | Reynolds et al. |
| 2004/0062305 | A1 | 4/2004 | Dambrackas |
| 2004/0093401 | A1 | 5/2004 | Buswell et al. |
| 2004/0117426 | A1 | 6/2004 | Rudkin |
| 2004/0249953 | A1 | 12/2004 | Fernandez |
| 2005/0027890 | A1 | 2/2005 | Nelson |
| 2005/0030377 | A1 | 2/2005 | Li |
| 2005/0094577 | A1 | 5/2005 | Ashwood-Smith |
| 2005/0114894 | A1 | 5/2005 | Hoerl |
| 2005/0125519 | A1 | 6/2005 | Yang |
| 2005/0132403 | A1 | 6/2005 | Lee |

OTHER PUBLICATIONS

The International Search Report and Written Opinion for PCT/US05/40948 dated Jul. 20, 2006.
The International Search Report and Written Opinion for PCT/US05/07684 dated Sep. 25, 2007.
The International Search Report and Written Opinion for PCT/US06/12280 dated Mar. 14, 2007.
The International Search Report and Written Opinion for PCT/US05/25275 dated May 11, 2006.
International Search Report for Application No. PCT/US05/25275, dated May 11, 2006.
Yueh-Feng, A Configurable Java Architecture for Mobile Terminal Software Download, Wireless Communications Conference, WCNC2002 IEEE, Mar. 17-21, 2002, vol. 1, pp. 144-149.
The International Search Report and Written Opinion issued on Sep. 19, 2007, in PCT application No. PCT/US06/38567.
The Office Action issued in U.S. Appl. No. 10/666,940.
The Office Actions issued in U.S. Appl. No. 10/988,184.
The Office Actions issued in U.S. Appl. No. 10/799,349.
The Office Actions issued in U.S. Appl. No. 11/102,450.
The Office Actions issued in U.S. Appl. No. 11/241,845.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, Outlook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621.
Apex et al, Products Brochure, APX 316848-316909.
Apex et al, Products Brochure, APX 316910-316969.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov. 1996.
Cybex, 4×P & 1×P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer, Inc.'s Response to Plaintiff's Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiff's First Set of Interrogatories (Nos. 9-12), Aug. 31, 2001.
Defendant Raritan Computer, Inc.'s Supplemental Response to Plaintiff's Second Set of Interrogatories (Nos. 9-12), Dec. 12, 2001.

DEI, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, Jun. 14, 2004.
Findings and Conclusions, *Apex* v. *Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Swtiches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent* v. *Raritan*, Civil Action No. 4435, Feb. 3, 2005.
Marksman Transcript, *Avocent* v. *Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwtich, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Swtich, Nov. 8, 2000.
Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1, Jan. 2002.
Trial Transcript, *Apex* v. *Raritan*, Southern District of New York, Case No. 01-CV-4435, vol. 2, Jan. 2002.
Trial Transcript, *Apex* v. *Raritan*, Southern District of New York, Case No. 01-CV-4435, vol. 3, Jan. 2002.
Trial Transcript, *Apex* v. *Raritan*, Southern District of New York, Case No. 01-CV-4435, vol. 4, Jan. 2002.
Trial Transcript, *Apex* v. *Raritan*, Southern District of New York, Case No. 01-CV-4435, vol. 5, Jan. 2002.
Trial Transcript, *Apex* v. *Raritan*, Southern District of New York, Case No. 01-CV-4435, vol. 6, Jan. 2002.
Trial Transcript, *Apex* v. *Raritan*, Southern District of New York, Case No. 01-CV-4435, vol. 7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition, Case No. 01-CV-4435, Dec. 6, 2001.
The list of docket reports in the litigation: *Avocent Redmond Corp.* v. *Raritan Computer, Inc.*, Civil Action No. 1:01-CV-04435(PKC), United States District Court for the Southern District of New York.

* cited by examiner

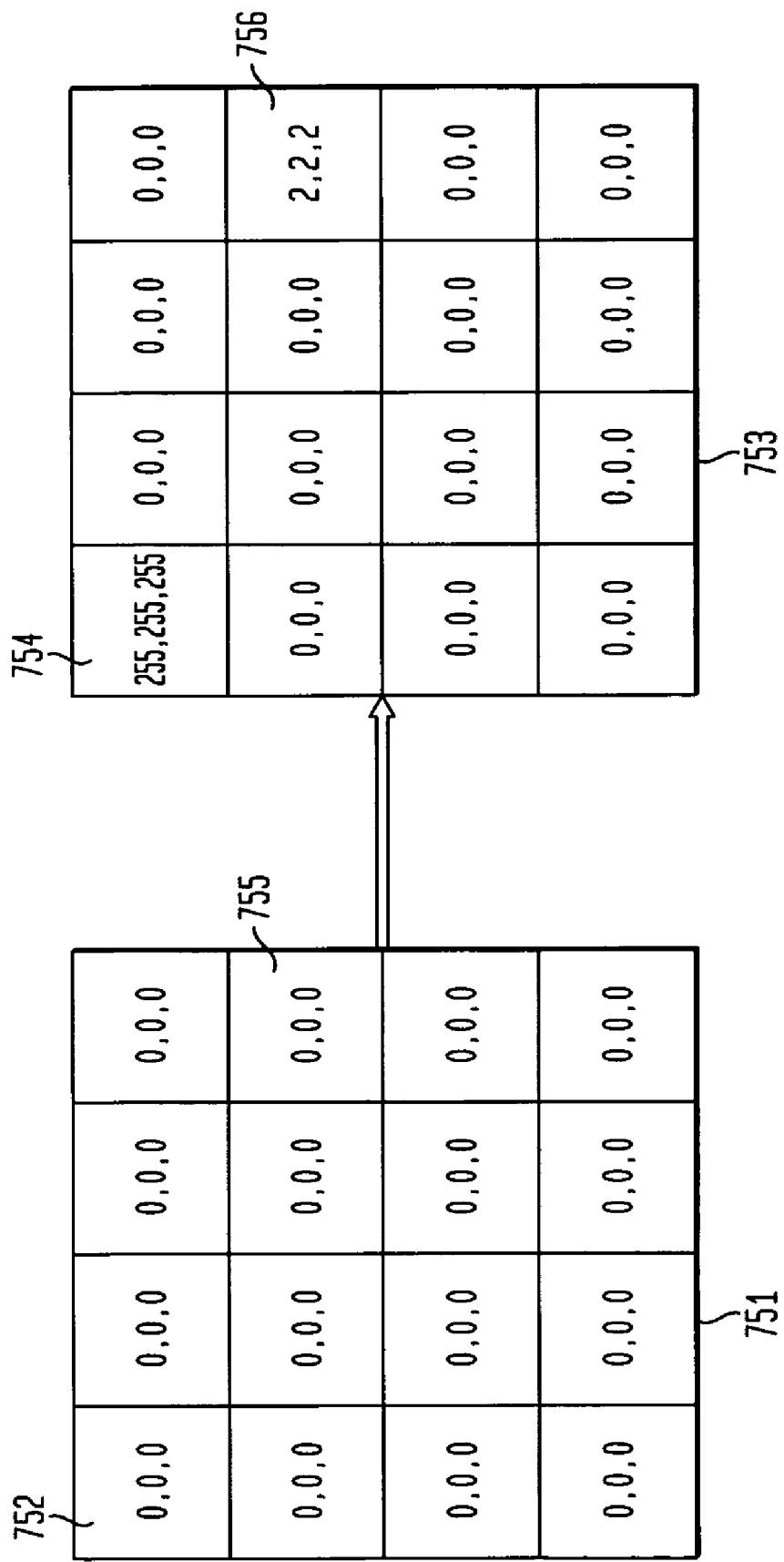

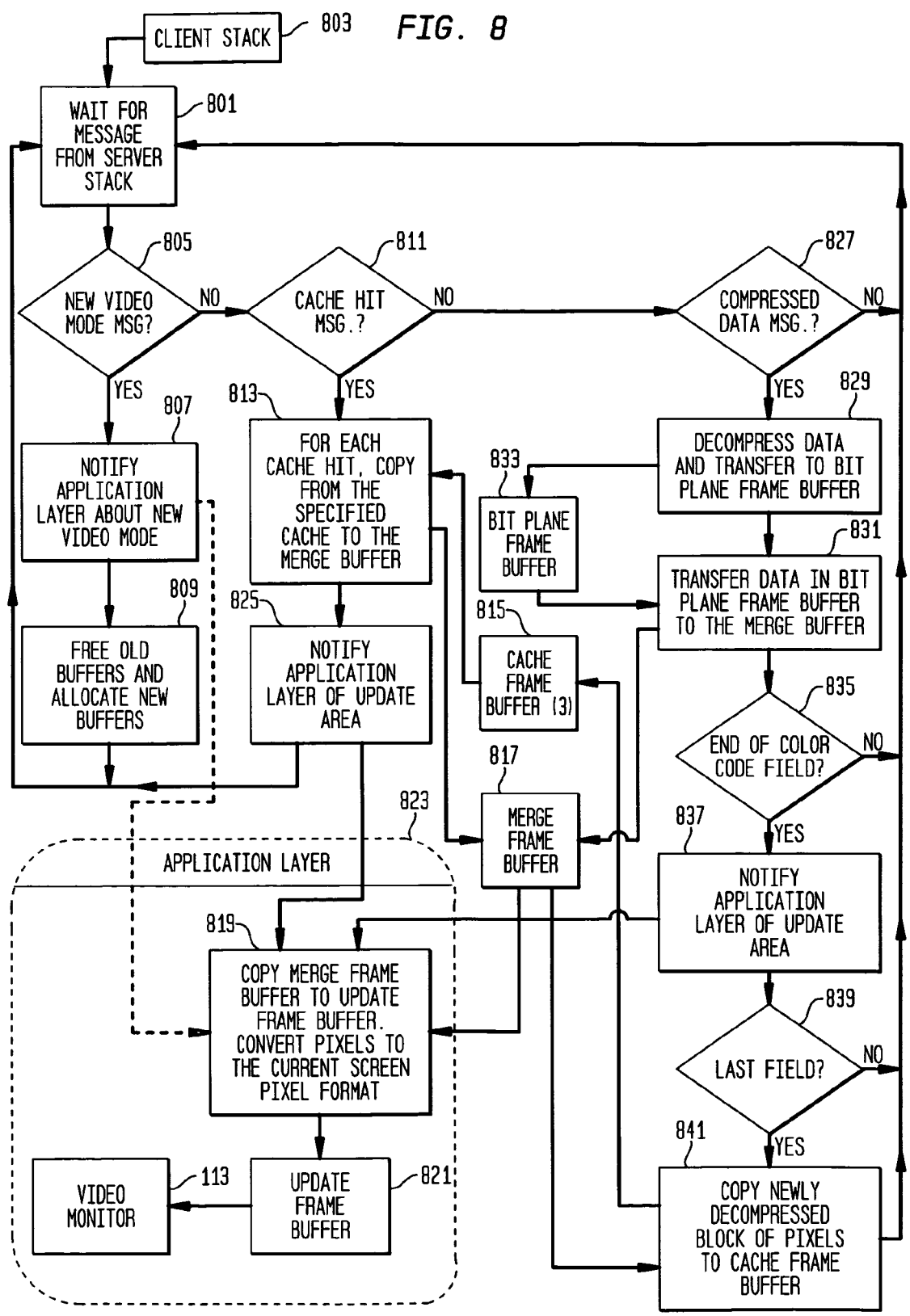

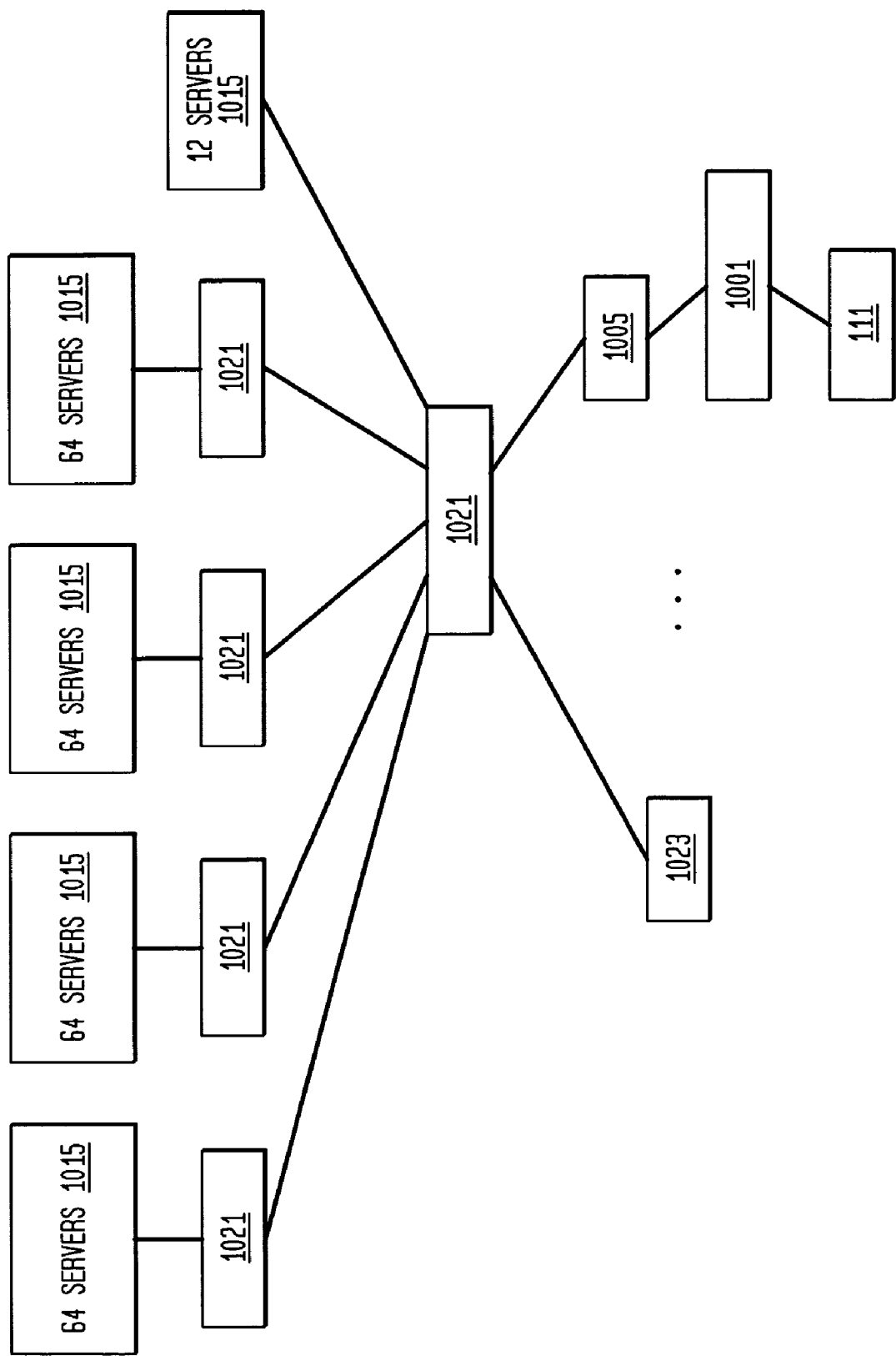

METHOD AND APPARATUS FOR CACHING, COMPRESSING AND TRANSMITTING VIDEO SIGNALS

CROSS-REFERENCE TO RELATED APPLICATIONS

This application is a continuation-in-part of application Ser. No. 10/233,299, filed Aug. 29, 2002.

TECHNICAL FIELD OF THE INVENTION

The present invention is directed generally to the field of compression and digitization of video signals from a remote computer. More particularly, this invention relates to a method of effectively digitizing, compressing, and caching the video output of a computer such that the computer may be monitored and controlled from a remote location.

BACKGROUND OF THE INVENTION

The trend towards distributed computing, coupled with the pervasiveness of the Internet, has led to a decentralization of resources, such as files and programs, for users and system administrators. As this trend of decentralization continues, user information and data has the potential of being stored on servers and computers remotely located all over the world. The task of monitoring and maintaining such remote resources is physically trying, if not impossible without a method of effective remote access.

To this end, hardware and software solutions have been developed which allow users to access and control computers remotely. Early solutions include software programs that allow text-based control of remotely located computers. An example of this would be a user running a telnet program on a simple Windows-based computer to access files and run programs on a UNIX server. This scheme requires software to run on both the remote server and the user's computer. Furthermore, the telnet programs are normally limited to text.

More advanced software programs have been developed that allow for graphical user interfaces and greater degrees of control. Examples include Windows® XP® remote desktop, and the software program PCAnywhere®. In many of these solutions, a user can control and view a remote computer as if the computer were local, with full control of the mouse and keyboard. However, like the rudimentary telnet schemes, PCAnywhere® relies on software running on both the client computer and the server computer. If either software program fails, the local computer loses control of the remote computer. Thus these solutions are often not robust enough for, among other things, system administration.

Another major drawback of these software solutions is the consumption of processing power (e.g., memory and microprocessor execution time) on the remote computer or server. In addition, once the connection is established, these solutions normally use the remote computer's existing modem or Internet connection to communicate with the local device. Thus, these software solutions consume a substantial portion of the bandwidth available to the server. Both the bandwidth consumption and the power consumption can severely degrade system performance.

In addition, software solutions do not give a system administrator full access to the remote computer at all times. For example, while the computer is rebooting and while the operating system loads, the software program is not running. Therefore, the system administrator does not have access to the server during these periods. This is a major pitfall especially if the system administrator wishes to view or edit BIOS settings or view the server restart (e.g., to perform system upgrades, to debug the system, etc.).

To avoid the aforementioned pitfalls of pure software solutions, system administrators use hardware solutions which are less reliant on the remote server in order to function. For example, keyboard, video, and mouse ("KVM") switches have been developed that allow a single keyboard, video, and mouse to control multiple computers. The computers are often remotely located from the user or system administrator's computer (i.e., the local computer). These switches route the keyboard and mouse signals of the user computer to one of the remotely located computers chosen by the user. Similarly, the video output of the chosen computer is routed to the attached local monitor. Generally, the user is able to switch to any of a series of remote computers.

Additional hardware solutions include intermediate switches and cables that increase the distance that may separate a user and a remote computer. These solutions can also increase the number of computers a user may control with one keyboard, monitor, and mouse. However this network is generally hampered by a distance limitation.

The KVM switches have advantages over software solutions because they are not reliant upon software running on the remote computer. If a system administrator needs to control and view a computer during "boot up" or to fix a problem with BIOS, the user can accomplish this via a remote keyboard, mouse and monitor linked via a KVM switch. Conversely, this would not be possible with a software solution.

However, most hardware solutions are constrained by distance requirements that limit how far a user workstation can be from a remote computer. Specifically, after a certain distance, signal degradation adversely affects the quality of the video signal transmitted. Therefore, disadvantageously, if a system administrator or user needs access to a computer, the user still has to be within a certain distance of the computer. Although switches and signal repeaters can alleviate the distance requirement to an extent, such solutions are still not feasible for controlling dispersed computing resources (e.g., servers dispersed across a city, state, country, etc.).

A KVM switch whereby the keyboard, video, and mouse signals are sent over standard Internet protocols or telephone connections maybe utilized to circumvent transmission quality over extended distances. This allows any Internet or modem enabled device with a keyboard, video and mouse to control a remote computer regardless of the physical distance between a user computer and a remote device.

However, it has been proven in the art that the creation of such a system is much more difficult to implement than a direct wired KVM switch. In order to send video, keyboard, and monitor signals using a protocol such as those used on the Internet (e.g. TCP/IP, UDP) such analog signals must first be converted to digital signals. The digital signals, in uncompressed form, require a large bandwidth to be transmitted in near real-time. Generally, even high-speed connections such as T1, cable and DSL are incapable of accommodating such bandwidth requirements. Therefore, in order for such a device to be useful in these situations, the analog outputs of conventional monitors must be both converted to a digital signal and compressed.

Video compression ideally exploits redundancies in video signals, both between successive frames of video, and within each individual frame. The transmission of a video signal from a computer monitor output generally has both spatial and interframe redundancies. For example, in a near idle computer, the only change between successive frames of video might be the blinking of a cursor. Even as a user types a document, a majority of the screen does not change over periods of time.

Existing video compression standards are designed for common video applications, and are thus not optimized for KVM switch applications. There thus exists a need in the art for a specialized KVM-specific algorithm capable of taking advantage of temporal redundancy, yet still capable of transmitting changes without a large loss of information.

Further, most forms of video compression known in the art require complicated calculations. For example, the MPEG standards use the discrete cosine transform as part of the compression algorithm. This standard relies on the recognition of "motion" between frames to calculate motion vectors to describe how portions of the image are affected over a period of time. These calculations are complicated and require a combination of expensive hardware, or result in extended transmission periods due to increased computation time.

Finally, many of the existing video compression techniques are lossy (i.e., they reduce the amount of information transmitted in order to reduce bandwidth). Typically, such lossy techniques either reduce the detail of an image or reduce the number of colors. Although reducing colors could be part of an adequate compression solution for computer monitor output, excessive reduction of images may yield a poor video transmission resulting in an illegible video reproduction. For example, if a computer user were attempting to use a word processor, reducing detail could lead to blurry or illegible text.

Several known systems directed to the field of compression and digitization of computer video signals are known, including some systems that operate in an environment of a user computer controlling a remote computer.

For example, a system is known for comparing sub-blocks of an image between successive frames of video and only encoding the differences between the blocks for transmission. In this system, the block-by-block comparisons are completed in the transform domain. Thus the system requires extra computations necessary to compute the transform of the image thereby increasing the time necessary to complete the video compression. In order to obviate the problem and reduce transmission times, this system must require fast and/or complex hardware. The present invention improves upon these time consuming extra computations by completing the block comparisons in the spatial domain. For example, the present invention utilizes a two-level thresholding method to ensure that the block comparisons are effective.

Another system is known that teaches a method of caching previously occurring frames of video to decrease the necessary bandwidth for transmission. The process used by this system compares pixels and retransmits changes between pixels of successive frames of video. Such a system uses a reference memory which may be used to store more than just one previous video frame, allegedly resulting in better cache performance.

Also known in the art of video compression is a method for block-by-block comparison of sequential frames of video, where only changed pixels are retransmitted. This method stores changed pixels in a matrix which is vector-quantized to one of a standard set of matrices. However, this method is likely inadequate for enabling remote control of a computer because it fails to teach methods that take into account noise that maybe introduced into the video through digitization errors.

Another system known in the art is a camera that receives analog video signals and digitizes these signals by implementing a microprocessor that divides the signals into blocks. The blocks of video are then classified and run-length encoded.

A system is also known for digitizing video signals for manipulation and transmission using a method whereby video raster signals from a data processing device are analyzed to determine the information content of the video signal. Although the system uses a method for compressing video, this method relies on analyzing the content of the video and sending that content. Thus, in general, the full graphical interface is not displayed to the user.

Another system is known for high-resolution video conferencing without extreme demands on bandwidth. The system creates a mosaic image by sampling portions of a scene and combining those samples, thus allowing for transmission of video over low bandwidths. Although the system includes a means to reduce the data necessary for transmission, it does not compare frames of video. Further, it does not use lossless compression techniques.

Also known in the art is a system for controlling a remotely located computer. The system uses an interframe block comparison method where pixel values that even slightly change are retransmitted. This leads to the unnecessary retransmission of noisy pixels. The system may also use another method whereby an entire block of pixels is transmitted if a threshold percentage of pixels within the block have changed, which again leads to both unnecessary retransmission of pixels, and/or failure to transmit pixels that should be retransmitted.

For example, if all pixels in the current frame change from black to a dark gray due to noise introduced by the A/D conversion, all pixels will also be retransmitted unnecessarily because the total percentage (i.e. 100% of the pixels) would clearly exceed any predetermined percentage threshold. The system also fails to take into account legitimate changes. For example, an intended change to only a few pixels, e.g., 5 pixels, will be missed if the threshold is set to 6 pixels.

Finally, a system of sending control, status and security functions over a network such as the Internet from one computer to another is also known. In this system, a system administrator can access a KVM switch remotely over the Internet and control the switch. Therefore, in and of itself, this system would not allow a remote computer to be operated over a low-bandwidth connection.

Based on the aforementioned disclosures and related technologies in the art, it is clear that there exists a need for a video compression method designed specifically for remotely monitoring and controlling a computer that is accurate and virtually provided in real-time. Furthermore, there exists a need in the art that allows for platform independent monitoring of computers, even at limited bandwidths provided by standard modem connections. Accordingly, the present invention overcomes the shortcomings of the prior art by recognizing minor changes due to noise, and implementing a more efficient calculation method and with a cache capable of storing previous blocks. Furthermore, the present invention recognizes significant changes (i.e. a pixel changing from black to white due to a cursor). In addition, slight color variations will be smoothed due to the color code and noise reduction methods of the present invention.

SUMMARY OF THE INVENTION

Most systems employed in the art for compressing and digitizing video signals are not designed for management of remote computers and devices. The present invention provides an improved method for transmitting video signals from a remote computer to a local video monitor. The method includes the digitization, compression, and caching of video signals, which results in efficient bandwidth usage and accurate video transmission from a remote computer to a local video monitor. More specifically, the present invention is directed to keyboard, video, and mouse control systems. The disclosure includes a method and device for transmitting video signals via a modem connection, an Internet connection, a LAN/WAN connection, etc. to enable a user to remotely view, monitor and control a remote computer. The present invention also includes a corresponding decompression technique that allows video signals to be displayed on a monitor. In short, in the preferred embodiment, the digitization, compression, and caching techniques of the invention allow for the viewing of a remote computer's video output on a local video output device such as a monitor. Furthermore, the invention can be interfaced with a KVM switch so that multiple remote computers can be controlled and monitored.

The connection between the remote computer and the local user workstation may comprise a network, such as a local area network (LAN) or wide area network (WAN), the Internet, a wireless connection, a modem, etc. Keyboard and mouse signals are transmitted from the user workstation to the remote computer. In the opposite direction, video signals, which are digitized, compressed, and cached according to the invention, are sent from the remote computer to the local user workstation.

The methods of digitization, compression, and caching allow for platform independent communication between computers. Thus, the local computer can control one or more remote computers utilizing a variety of computer platforms, operating systems and protocols. These operating systems and protocols may include, but are not limited to, those manufactured by Microsoft Corporation ("Microsoft") (Windows), Apple Computer, Inc. ("Apple") (Macintosh), Sun Microsystems, Inc. ("Sun") (Unix), Digital Equipment Corporation ("DEC"), Compaq Computer Corporation ("Compaq") (Alpha), IBM (RS/6000), Hewlett-Packard Company ("HP") (HP9000), SGI (formerly Silicon Graphics, Inc) ("IRIX"), etc. Additionally, local devices may communicate with remote computers via a variety of protocols including, but not limited to, USB, American Standard Code for Information Interchange ("ASCII"), Recommend Standard-232 ("RS-232"), etc. The present invention may be used to control a remote serial terminal device, such as a printer, fax machine, etc. In the preferred embodiment, a serial terminal device can be connected directly to the present invention or through a serial concentrator and can be controlled from the local application. In another embodiment, the serial concentrator is linked with the keyboard, video, and mouse.

Accordingly, the device uses compression and caching techniques that have been designed to improve video transfer times for video having characteristics exhibited by computer monitor output. The compression can be accomplished using readily available hardware providing a viable device that would allow a remote computer to be controlled via a local keyboard, video and monitor equipped computer, so long as the remote device and the local keyboard, video and monitor can communicate via the Internet, a direct modem connection, or a LAN/WAN etc.

The algorithm used by the present invention is preferably comprised of four (4) sub-algorithms: (1) noise reduction and smoothing; (2) block difference test; (3) caching; and (4) bit-splicing and compression. Each is summarized below.

The noise reduction and smoothing (NRS) sub-algorithm has three purposes: (1) it reduces the noise introduced by the analog-to-digital conversion of the video signal (2) it increases spatial redundancy in an image to augment the effectiveness of the compression algorithm, and (3) it converts the representation of each pixel to a more compact form. Preferably, these functions are accomplished using histogram analysis and pixel mapping with a color code look-up table. The NRS sub-algorithm preferably operates on blocks of pixels. Many different block sizes may be used, for example 8×8 pixels, 16×16 pixels, 32×32 pixels, 64×32 pixels, etc. The block size may stay constant or may dynamically adjust based on the size of the entire image, the bandwidth of the connection, etc.

For a block of pixels, the NRS sub-algorithm first generates a histogram of pixel values to identify "noisy" pixels. Specifically, a histogram of pixel values is created and sorted by frequency of occurrence. Then, the algorithm identifies infrequent pixel values that are "similar" to more frequent pixel values (i.e., the algorithm identifies those pixels that are noisy). To determine the similarity of two pixels, a distance metric is used based on the red, green, and blue (RGB) components of each pixel. In alternative embodiments, a similar distance metric can be used, based on the appropriate components of the pixel for that embodiment.

Next, those pixels that are identified as "noisy" are mapped to more frequently occurring pixel values. It is preferred that a color code look-up table be used to perform this mapping. A color code look-up table is used to convert a pixel representation to a more compact form. For example, a common video standard (i.e., 24-bit RGB) uses 8 bits to represent each of the red, green, and blue components of a pixel. A color code look-up table may map this representation to a more compact form, whereby, e.g., only 4 bits are used to represent each component of a video signal. In the preferred embodiment of the present invention, the color code look-up table converts each pixel to an 8-bit representation, wherein 3 bits represent a red component, 3 bits represent a green component, and 2 bits represent a blue component.

If the color code look-up table is dynamic, it can be used to not only reduce the number of bits used to represent each pixel in a frame of video but to implement noise reduction. Specifically, the color code look-up table may be used to convert a "noisy" pixel by mapping it to the same color code as a similar, more frequently occurring color. Thus, the noise is efficiently removed from each block, while at the same time, the number of bits used to represent each pixel is reduced. In short, the NRS sub-algorithm is performed to exploit spatial redundancies in a video frame.

The next sub-algorithm, a block difference test (BDT) sub-algorithm, exploits temporal redundancies between successive frames of video. Using a unique two-level thresholding analysis, the BDT sub-algorithm identifies blocks of pixels that have significantly changed between successive frames of video. Any block that has not significantly changed is not transmitted to the local video monitor. Therefore, (1) the BDT sub-algorithm reduces the amount of bandwidth needed for transmission, and (2) the local user station only needs to update parts of the screen that change.

The two-level thresholding technique is used to determine if a block of pixels has changed significantly between successive frames of video. General technologies in the art employ compression systems that are highly susceptible to error and noise. For example, if prior art methods were used for retransmitting the image, then often large portions of the image would be resent unnecessarily due to the small error in the image as a result of noise created during the A/D conversion.

The present invention preferably uses a unique two-level thresholding method to determine if a block of pixels has changed between successive video frames. The method operates on a block of pixels from the current frame of video, and a block of pixels from the previous frame of video (the compare frame). The compare frame buffer contains the image data from previously captured frame buffers.

For each pixel in a block, the algorithm computes a "difference" value indicative of how the pixel changed between the current frame and the compare frame. The distance value is compared with a "pixel threshold." If the distance value exceeds the pixel threshold, it is added to a distance sum. This running sum is calculated for all pixels in the block.

The total distance sum is then compared with a "cell threshold." If the sum exceeds the cell threshold, then the block of pixels is considered "changed"; the compare frame buffer is updated with the pixel-block from the current frame, and the pixel-block is sent in a compressed format to the local video monitor.

If the distance sum is not greater than the cell threshold, the block is considered "unchanged" (i.e., any changes are insignificant). Neither the compare frame buffer, nor the local user's screen is updated with the block of pixels.

Advantageously, this algorithm can detect a large change in a few pixels or a small change in a large number of pixels. The method is thus more efficient and accurate than known algorithms that simply count the number of changed pixels in a cell. Consider, for example, if a user were editing a document. If the user were to change a letter, such as an "E" to an "F", only a few pixels would change in a video representation of that change. However, the result exhibited by these few pixels would be dramatic. A percentage threshold algorithm would not register this change leading to a display error. A percentage threshold algorithm, by only looking at the number of pixels within a block that have changed, generally fails at recognizing a case in which a few pixels change a lot. However, the present invention, by virtue of the two-level thresholding method and apparatus recognizes that the block of pixels has significantly changed between frames of video.

The third sub-algorithm, caching, is also used to exploit temporal redundancies in the video signals. The caching sub-algorithm is preferably performed on a block of pixels within a frame. Like the other sub-algorithms, caching can operate on pixel-blocks of any size.

Caching is a technique traditionally used in memory management. A "cache" is temporary storage that can be accessed faster than other forms of memory. For example, general purpose computers often use caches with access speeds that are faster than RAM. Frequently accessed portions of RAM are stored in cache so that access to this memory is fast, thus increasing the performance of the computer.

The same principle is also used by web-browsers in caching recently viewed web-pages on a computer. If a web-page is stored in cache, the web-browser can display the "cached" version of the web-page rather than retrieving it through a connection to the Internet (this is important if the network connection is slow). The same principle applies to the present invention. A local user workstation has a cache of recently transmitted video so that a server only transmits blocks of video data not stored in the cache. Thus, the present invention uses caches to improve video transmission from a remote computer to a user workstation. In short, the purpose of the cache is to store blocks of recently transmitted frames of video to obviate the need to retransmit these blocks from a remote computer to a user workstation.

In the invention, the remote computer and the user workstation both have memory designated as a cache. Ideally, the remote computer and user workstation should have identical blocks of video stored in each cache (i.e., the caches should be synchronized). If a block of a video frame is stored in the cache, the remote computer simply transmits a reference code to the address in memory where the block is stored. Thus, using caches decreases the bandwidth needed to transmit video from a remote computer to a user workstation.

Like other sub-algorithms, caching preferably operates on a block-by-block basis. That is, a frame of video is divided into pixel-blocks. Then, each pixel-block is compared to corresponding pixel-blocks in cache. The cache preferably stores a history for each block of video data that comprises a video frame. For a given block, the history is the contents of that block in previous video frames. The "depth" of this history is dependent on the size of the cache. For example, a large cache size might allow for a depth of 8—that is, for a given block of video data, eight different instances of that block can be stored. A smaller cache might have a depth of 2 or 4.

For a given block, a "cache hit" occurs when that block is found in the cache. Conversely, a "cache miss" is defined as not finding the block in the cache. When a block is found in the cache (cache hit), only a reference to the portion of cache with that block needs to be transmitted from the remote computer to the user workstation. When a block is not found in the cache (cache miss), the cache must be updated, and the block of pixels must be transmitted from the user workstation to the remote computer. Intuitively, a larger cache size should lead to a larger percentage of cache-hits. However, a larger cache size requires more memory, hardware, and processing. For example, if a large cache size is used, a block of pixels must be compared to all corresponding blocks stored in the cache increasing the time it takes to perform a cache comparison and/or the processing capabilities needed by the remote computer and user workstation.

The cache of the present invention should be optimized to generate a large percentage of "cache hits". If a block does not change from one frame to the next, then (1) it does not have to be transmitted to the user workstation, and (2) the cache history for that block does not need to be updated. Therefore, for portions of a video screen that do not change often (e.g., a desktop background), utilizing a cache reduces the bandwidth needed to transmit a full frame of video. Further, for these portions of video, the cache rarely needs to be updated (i.e., the history for the block of data does not often change).

For areas of the screen that change frequently, it is critical to use an efficient cache replacement algorithm (i.e., an algorithm that effectively updates the cache by overwriting part of a cache history). In situations where a block of data might repeat previous patterns (e.g., if a user switches between multiple applications), an efficiently updated cache can still save bandwidth needed for transmission of data.

Because caches are necessarily of finite size, cache performance is dependent on an effective algorithm for updating old cache data with new cache data. The invention preferably stores a history of block data for each block that comprises a frame of video. The invention therefore must use an effective algorithm for updating the history for each cache.

Many cache replacement algorithms are known and have been studied in great depth for efficiency. The present invention is compatible with any replacement algorithm, but in a preferred embodiment, uses the least recently used ("LRU") algorithm. LRU replaces the portion of cache which has not been used for the longest period of time. Like other parts of the compression and caching algorithm, the LRU preferably operates on a block by block basis (i.e., the depth of history each block preferably is the same). LRU's efficiency is based on the observation that blocks which have been referenced in the recent past will likely be referenced again in the near future. Therefore, it is most likely that the block in cache which has not been used for the longest period of time will not again be used. Thus, replacing this block is likely least detrimental on the performance of the cache.

Other caching algorithms can be used in place of the least recently used algorithm. For example, the Most Recently Used (MRU) algorithm is also called Fetch-and-Discard replacement algorithm. The Least Frequently Used (LFU) algorithm is another replacement algorithm that replaces the block used least frequently.

When a frame of video is received from a remote computer, it is divided into blocks of pixels. After noise reduction and smoothing, the algorithm determines which blocks need to be transmitted to the user workstation and which blocks are stored in the cache. If a cache has a large depth, comparing a block of pixels to corresponding blocks from previous frames can become computationally intensive, especially if the comparison is performed on a pixel-by-pixel basis. To improve the efficiency of this step, it is preferred that a hash-code or a cyclic redundancy check (CRC) be computed for a given block. This code is then compared with the hash code or CRC of the blocks stored in cache. If there is a match, there is a very high probability that the block is stored in cache and that it does not need to be retransmitted.

A hash code function creates a "key" representative of a larger string of data. Because a key is smaller than the string of data it is necessarily not unique for a given string. When the hash function computes identical keys for two non-identical strings, this is called a "collision". Although collisions are unavoidable because there are necessarily less keys than strings, a hash function can be designed that minimizes the probability of collisions. In the system of the present invention, multiple different hash codes can be computed for a given pixel block of data to further minimize the probability of incorrectly equating two different blocks.

A cyclic redundancy check is similar to a hash code function in that it is a number calculated from a block of data. CRC's are traditionally used for error detection. In the invention, a CRC can be used as a basis for comparing two blocks of data, like a hash code. Alternatively, a combination of a hash code and a CRC check can be used, again to severely limit the probability of collisions (i.e., incorrectly identifying two different blocks as equivalent).

Thus, in a preferred embodiment, two hash code functions are calculated for a block of video data and compared with hash codes for corresponding blocks stored in a cache. If the hash codes of the block of data match with what is in the cache, this is an indication to the system that the block of pixels is stored in cache and does not have to be transmitted from the server to the user workstation.

If the hash codes for a block of data do not match the hash codes of what is stored in cache, this is an indication to the system that the block of data is not stored in the cache. In this case, the block is transmitted from the remote computer to the user workstation in accordance with the algorithm of the present invention. Further, the cache history for that block of pixels is updated according to the LRU replacement algorithm.

Next, after the temporal redundancy checks are performed, blocks that have changed and that are not found in the cache are compressed and transmitted to the user workstation. In the preferred embodiment, the blocks are compressed using the Joint Bi-level Image Group (JBIG) lossless compression technique.

JBIG is lossless and was designed for black and white images, such as those transmitted by facsimile machines. However, the present invention compresses and transmits color images. Therefore, in order to utilize the JBIG compression technique, the color image must be bit-sliced and the subsequent bit-planes must be compressed separately.

A bit-slice of a color image is created by grabbing the same bit from each pixel across the whole image. Thus, if each pixel in a video frame is represented by 8 bits, 8 bit-planes are created. The color code look-up table uses a compact form in which the most significant bits of each pixel are stored first, and the lesser significant bits are stored last. Thus, the first bit planes will contain the most significant data and the last bit-planes will contain the least significant data.

By combining the JBIG compression technique with the color code lookup-table, the method and apparatus of the invention compresses and transmits the most significant bits of a frame of video first. Thus, the local computer will receive video from the remote computer progressively, receiving and displaying the most significant bits of the image before receiving the remaining bits. This method is less sensitive to changes in bandwidth and allows a user to see a frame of video as it is transmitted, rather than waiting for all details of the frame to be sent.

In an alternate embodiment, the system and method of the invention is also capable of calibrating the analog to digital conversion automatically "on the fly" so that the whole range of digital values is used. For example, if the device is supposed to transmit values between 0 and 255 (i.e., general pixel depth values), but instead only transmits values between 10 and 245, it will dynamically adjust the gain of the A/D converter to take advantage of the full range of digital values. This adjustment can be done for the red, green and blue components on an individual basis or a cumulative basis. By adjusting this range, the user receives more accurate representations of the video.

Finally, further disclosed is a decompression method and apparatus used to receive data from the compression device and convert the data so that it may be displayed on the user's local video monitor. The decompression device (which may be implemented as software on a standard personal computer) is capable of bi-directional digital communications to receive video data from the compression device and transmit keyboard and mouse data to the compression device. In an alternate embodiment, the decompression device also includes a means to control a serial device by transmitting serial data. Thus, the decompression device enables a local user to control a remote computer using a local keyboard, video, mouse, and serial device.

The decompression device reconstructs frames of video based on the messages received from the compression device. Thus, the decompression device contains a frame buffer with the most up-to-date video data. The data in the frame buffer is sent to a display device so that the user can view the data from the remote computer.

The image in the frame buffer is constructed using a combination of data from a cache and transmitted data from the remote device. For blocks of video data that yield "cache hits", the remote computer transmits a reference to the location in cache where the block can be found. The actual block of data is not transmitted. Therefore, the user workstation must "reconstruct" the frame buffer by retrieving data from its cache.

For all blocks not found in cache, the user workstation must update the cache so that it remains synchronized with the remote computer. Importantly, the remote computer and the user workstation must use the same cache replacement algorithm to remain synchronized. As discussed above, although any cache replacement algorithm may be used, it is preferred that both the user workstation and the remote computer use the least recently used (LRU) replacement algorithm.

The compression device sends video data that has been compressed using a lossless compression algorithm such as JBIG. Therefore, further disclosed is a method and apparatus which reverses this lossless compression. This decompression method and apparatus recognizes the changed areas of the image based on flags transmitted by the compression device. From this information, the decompression technique reconstructs the full frame of video.

In addition, the frame of video is converted to a format that may be displayed on the local video monitor by reversing the color code conversion. The decompression method is able to send the raw frame of video to the operating system, memory, or other location such that it may be received and displayed by the monitor.

Therefore, the decompression device, like the compression device stores a local copy of the color code look-up table. The device can then convert the data from the remote computer into a standard RGB format for display on the local monitor.

The decompression method can be implemented in a variety of ways. For example, in one embodiment, it is implemented as a software application that can be run in, for example, the Windows OS on an Intel Pentium powered PC. In an alternate embodiment, the decompression technique can be implemented such that it may run within a web browser such as Internet Explorer or Netscape® Navigator®. Such an embodiment would be more user friendly, therefore reducing the need for the installation of additional software on the local computer. Finally, in yet another embodiment, the decompression can be implemented in a device composed of a microprocessor and memory. Such an embodiment would further limit the necessary software stored on the local machine.

Since the present invention is used for controlling a remote computer from great distances, there is a need to ensure that the transmission of the video signals is secure. If not, there exists the potential that hackers or competitors could view or control one or more remote computers gaining access to sensitive information, tampering with the remote computer, etc. Therefore, the present invention was designed to easily integrate with digital encryption techniques known in the art. In one embodiment of the invention, a 128-bit encryption technique is used both to verify the identity of the user and to encrypt and decrypt the video stream transmission. A 128-bit public key RSA encryption technique is used to verify the user, and 128-bit RC4 private key encryption is used for the video streams.

In the preferred embodiment, this video compression apparatus and method is used to allow a local computer access to a remote computer. However, the compression and device is not limited to such an embodiment, and can be applied to future needs for the transmission of similar types of video in near real-time over low bandwidths.

Therefore, it is an object of the invention to provide a system and method for digitizing, compressing, and caching video signals for transmission from a remote computer to a local user workstation so that a user can remotely operate and monitor the remote computer.

It is another object of the present invention to provide a system and method for remotely transmitting compressed video signals from a remote computer to a local user workstation via a communications network (e.g., the Internet, a local area network, a wide area network, etc.).

It is yet another object of the invention to transmit a video signal with limited video signal degradation from a remote computer to a local user workstation.

It is still another object of the invention to condition digital video for compression and transmission from a remote computer to a local user workstation by reducing the effect of quantization noise.

Further, it is an object of the invention to condition digital video for compression and transmission from a remote computer to a local user workstation by mapping pixels to a compact representation according to a color-lookup table.

It is yet another object of the invention to exploit temporal redundancies between successive frames of computer video output to limit the bandwidth needed for transmission of the video to a local video monitor.

It is still another object of the invention to use a caching method to exploit temporal redundancies between frames of computer video output.

It is yet another object of the invention to use an efficient cache replacement algorithm to increase the effectiveness of the cache in storing video used to reduce the amount of data needed to transmit frames of video from a remote computer to a local video monitor.

Further, it is an additional object of the invention to provide an efficient method for searching for a block of data in a cache by computing one or more hash codes representation of the block.

It is still another object of the invention to provide an efficient method for searching for a block of data in a cache by computing a cyclic redundancy check code for that block of data.

It is another object of the invention to provide a method of compressing video signals for transmission to a video monitor over a TCP/IP network.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to the preferred embodiment as well as some alternate embodiments set forth in the illustrations of the accompanying drawings. Although the illustrated embodiments are merely exemplary of systems for carrying out the present invention, the organization, expanded configurations and method of operation of the invention, in general, together with further objectives and advantages thereof, may be more easily understood by reference to the drawings and the following description. The drawings are not intended to limit the scope of the invention, which is set forth with particularity in the claims as appended or as subsequently amended, but merely to clarify and exemplify the invention.

For a more complete understanding of the present invention, reference is now made to the following drawings in which:

FIG. 7 depicts an example application of the block difference test sub-algorithm as applied to a sample block of pixels as performed by the compression algorithm.

FIG. 8 is a flowchart illustrating an overview of the preferred embodiment of the video signal decompression in accordance with the present invention.

FIG. 12 illustrates still another system configuration for implementing the video signal conditioning, caching, compression and decompression in accordance with the present invention in which 16 local computers are capable of controlling 256 servers.

DETAILED DESCRIPTION OF THE PREFERRED EMBODIMENTS

Figure 1:
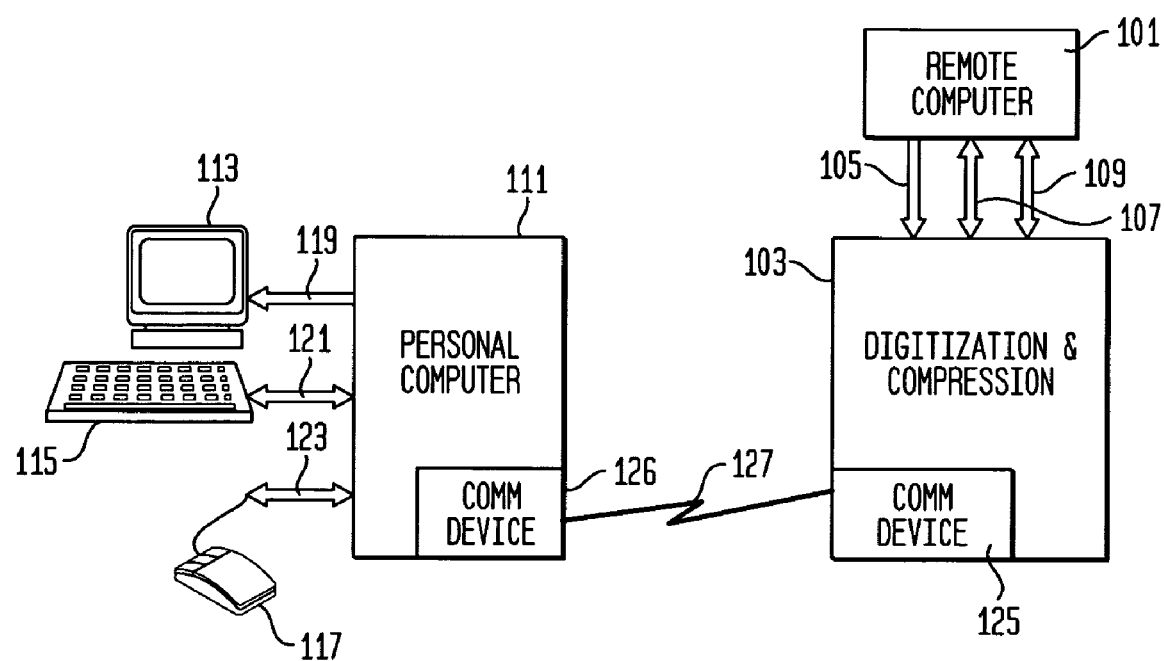
FIG. 1 depicts an overview of the preferred embodiment of the present invention in which the video compression device utilized to enable a user at a local computer to monitor and control a remote device.

As required, a detailed illustrative embodiment of the present invention is disclosed herein. However, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of the preferred embodiment (as well as some alternative embodiments) of the present invention.

Referring first to FIG. 1A, represented is a block diagram of the preferred embodiment of the present invention including a computer system for accessing and controlling a remotely located computer system. The term "local" will be from the perspective of the user who wishes to access a computer at a remote location. The term "remote" is at a different location from the user, and refers to the location of a remote computer accessible via the present invention. For example, FIG. 1A shows a configuration in which a user at local computer 111 remotely operates and/or monitors remote computer 101, which is connected to compression device 103. Remote computer 101 preferably connects to compression device 103 via standard monitor connection 105, standard keyboard connection 107 and standard mouse connection 109.

A user accesses remote computer 101 via local computer 111. Local computer 111 is preferably connected to monitor 113, keyboard 115, and mouse 117 via monitor connection 119, keyboard connection 121, and mouse connection 123, respectively. In the preferred embodiment, monitor 113, keyboard 115, and mouse 117 communicate with computer 111 independent of one another. Specifically, monitor connection 119, keyboard connection 121, and mouse connection 123 preferably consist of separate standard cables known in the art. However, any method of connecting monitor 113, keyboard 115, and mouse 117 to local computer 111 may be used with the present invention. For example, an alternative method is one in which keyboard 115 and mouse 117 connect to local computer 111 via a shared USB connection. In this embodiment, keyboard connection 121 and mouse connection 123 might be one physical cable. In another embodiment, keyboard 115 and mouse 117 can connect to local computer 111 via a wireless connection.

Compression device 103 preferably includes communication device 125, while local computer 111 includes local communication device 126, both of which are capable of bi-directional digital communication via connection 127. Communication device 125 and local communication device 126 may be a modem, a network card, a wireless network card, or any other device capable of providing bi-directional communication via connection 127. Similarly, connection 127 may comprise a local area network (LAN), a wide area network (WAN), a wireless connection, a wireless network such as an IEEE 802.11 compliant network, a modem-to-modem connection, or any other connection that enables communication device 125 and local communication device 126 to communicate. Communication device 125 and local communication device 126 enable compression device 103 and local computer 111 to communicate via any standard agreed upon protocol. Examples of these protocols include, but are not limited to, Transmission Control Protocol/Internet Protocol (TCP/IP), and User Datagram Protocol (UDP).

Compression device 103 receives and analyzes the video signals from remote computer 101 via standard monitor connection 105. Compression device 103 analyzes and converts the video signal so that it may be packaged for transmission via a standard Internet protocol. Local computer 111 receives the transmissions from compression device 103 via the bi-directional communications provided by communication device 125, local communication device 126, and connection 127 and translates the signal via a decompression technique corresponding to the compression technique used by compression device 103.

In addition to receiving monitor signals from compression device 103, local computer 111 receives signals from keyboard 115 and mouse 117 via keyboard connection 121, and mouse connection 123, respectively. These signals are sent using local communication device 126 to communication device 125 via network connection 127. Compression device 103 receives these signals from communication device 125 and transmits them to remote computer 101 via standard keyboard connection 107 and standard mouse connection 109. By utilizing the aforementioned method of transmitting keyboard, mouse, and video signals, the present invention allows a user at local computer 111 to control remote computer 101 as if the user were physically located at remote computer 101.

Figure 2:
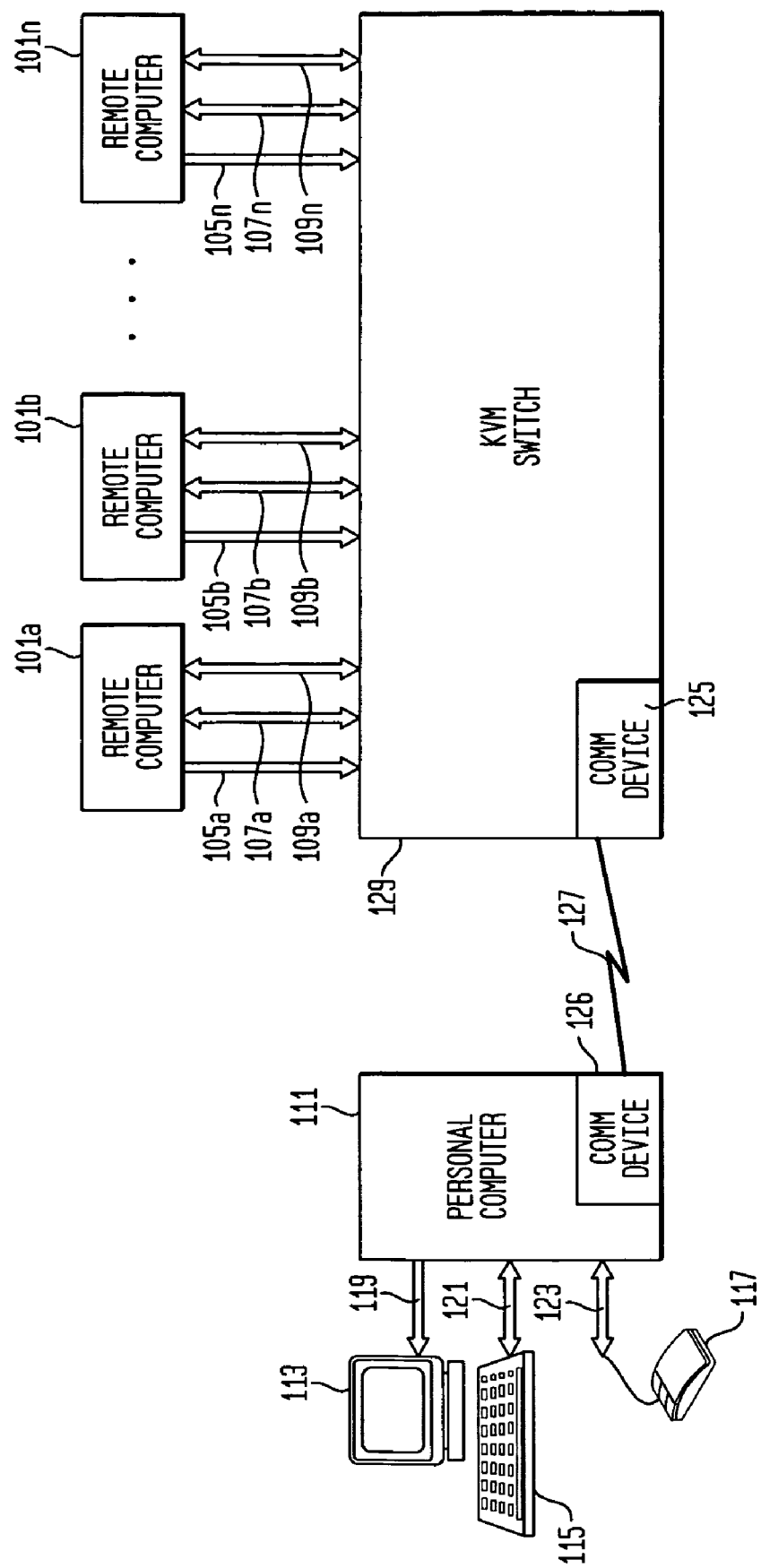
FIG. 2 illustrates an alternate embodiment of the present invention in which the video compression device is combined with a KVM switch such that a local user can control any one of a plurality remote computers.

Alternatively, as shown in FIG. 2, the compression hardware and software may be combined with or implemented with a KVM switch (e.g., KVM switch 129). As shown in FIG. 2, local computer 111 is capable of controlling any of a plurality of remote computers 101a-n. KVM switch 129 preferably has standard monitor connections 105a-n, standard keyboard connections 107a-n, and standard mouse connections 109a-n. Thus, in this embodiment, a user at local computer 111 may select any of remote computers 101a-n for remote operation.

Figure 3:
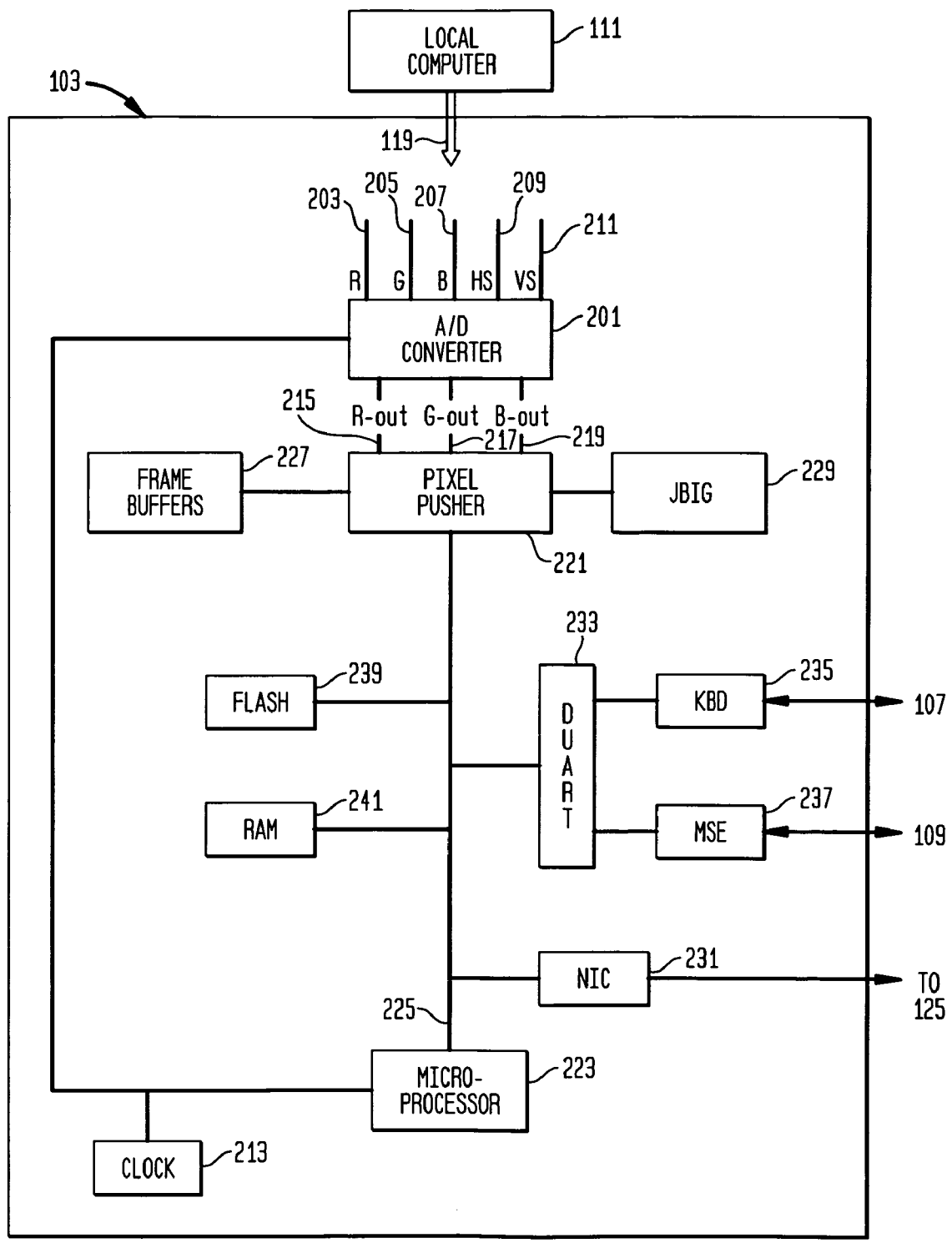
FIG. 3 is a block diagram of the preferred embodiment of the compression device including hardware used to interface with the remote computer and the communication device for digitizing and compressing signals.

Turning next to FIG. 3, depicted is a block diagram of the hardware used in compression device 103 according to the preferred embodiment of the present invention. One skilled in the art can readily recognize that there exist other designs that could be used to implement the compression algorithms of the present invention without departing from its spirit or scope.

The first step in compressing the video signals received from remote computer 101 is the conversion of the video from analog to digital, preferably performed by A/D converter 201. (Of course, if remote computer 101 outputs digital video signals, A/D conversion is unnecessary and need not be performed). A/D converter 201 receives analog red signal 203, analog green signal 205, analog blue signal 207, horizontal synch signal 209, and vertical synch signal 211. Clock 213 drives A/D converter 201 using means commonly employed in the art. The outputs of A/D converter 201 are shown as R-out 215, G-out 217, and B-out 219. Preferably these outputs are used to represent the red component, green component and blue component of the digitized video signal respectively. A/D converter 201 outputs pixels (e.g., one pixel at a time) and the results are stored in pixel pusher 221. Pixel pusher 221 communicates with frame buffers 227 to store the digitized video signals in memory accessible by microprocessor 223 and JBIG Compression device 229 using communication bus 225. Microprocessor 223 and JBIG Compression device 229 preferably implement the video signal conditioning, smoothing, caching and compression sub-algorithms on the video stored in frame buffers 227.

Communication bus 225 is connected to network interface card 231 and dual universal asynchronous receiver transmitter (DUART) 233. DUART 233 interfaces with keyboard port 235 and mouse port 237. Thus, A/D converter 201, keyboard port 235, and mouse port 237 allow compression device 103 to interface with remote computer 101. Further, network interface card 231 allows compression device 103 to interface with communication device 125. Compression device 103 receives analog video signals, bi-directionally communicates keyboard and mouse signals, and communicates with local computer 111 via communication device 125. Finally, by means of JBIG compression device 219, microprocessor 223, flash 239, and random access memory 241, compression device 103 can be programmed and configured to implement the video processing methods of the present invention.

Figure 4:
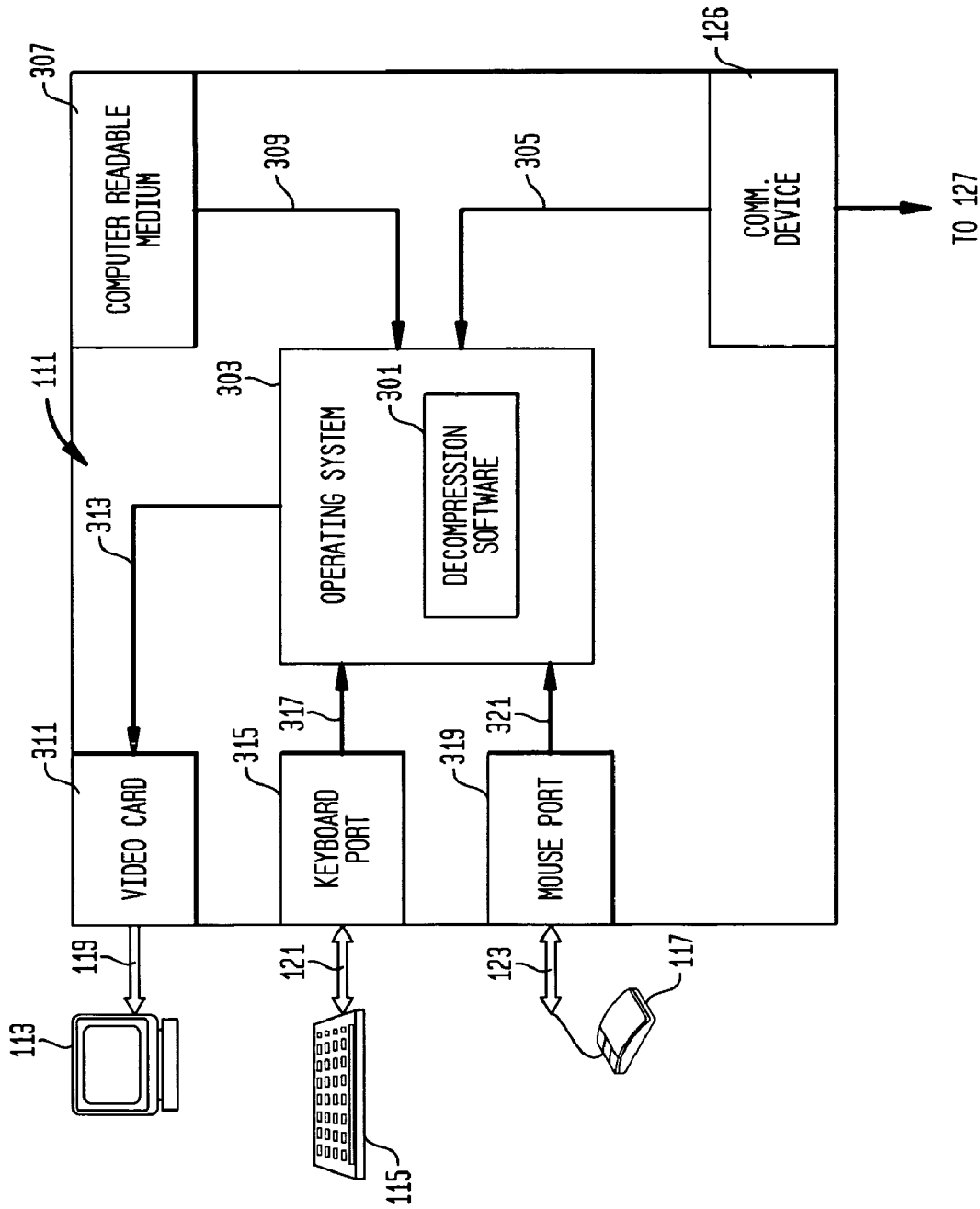
FIG. 4 is a block diagram of the preferred embodiment of the invention in which decompression is implemented through software running on a local computer.

Next, FIG. 4 illustrates an overview of the decompression methods of the present invention and how they may be implemented as software on a general purpose local computer 111. Local computer 111 runs operating system 303 capable of receiving data from local communication device 126 via operating system data link 305. Operating system data link 305 utilizes shared memory, a memory bus, or other device drivers. Local communication device 126 receives data from compression device 103 over network connection 127. When a user decides to operate remote computer 101, operating system 303 loads the decompression software 301 like any other process, from a computer readable medium 307 via computer readable medium to operating system data link 309. Decompression software 301 then accesses the data received from local communication device 126. Decompression software 301 is used to decompress data received from local communication device 126 and convert the data into data that can be interpreted by video card 311. The data is then transmitted to video card 311 via operating system 301 where it is then transferred to video card 311 via operating system data link 313.

Similarly, decompression software 301 receives signals from keyboard 115 via operating system's 303 operating system to keyboard connection 315 which connects to keyboard port 317. In a similar manner, decompression software 301 receives signals from mouse 117, via operating system's 303 operating system to mouse connection 319 to mouse port 321.

Figure 5:
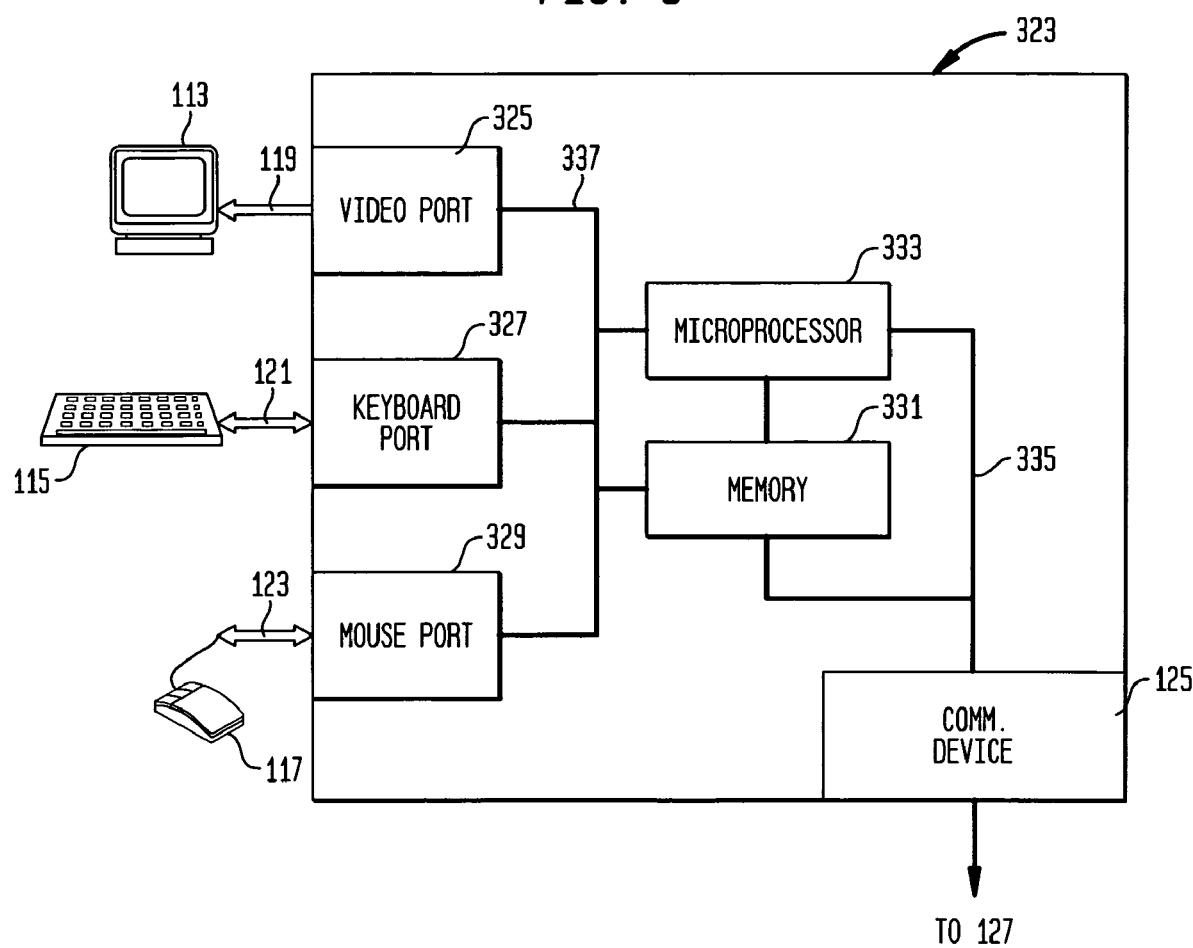
FIG. 5 depicts a block diagram of an alternate embodiment of the decompression device of the invention in which decompression is implemented through a specialized decompression device.

Although having the decompression completed in software is preferred, it would be apparent to one skilled in the art, that such decompression could also be completed by means of a hardware solution. For example, FIG. 5 shows a decompression device 323 that can accomplish the same decompression as decompression software 301. In this case, decompression device 323 replaces local computer ill and further includes local communication device 126. Monitor 113, keyboard 115, and mouse 117 attaches to decompression device 323 via the monitor connection 119, keyboard connection 121, and mouse connection 123 via monitor port 325, keyboard port 327, and mouse port 329 respectively. In this embodiment, the data from monitor port 325, keyboard port 327, and mouse port 329 communicates with memory 331 and microprocessor 333 to run the decompression methods of the present invention.

The decompression method receives data from local communication device 126 and transmits a decompressed version of the data to monitor 119. In this embodiment, there exists a connection between local communication device 126 and memory 335 as well as connection between video port 325, keyboard port 327, and mouse port 329 with memory 331. These connections enable decompression device 323 to send data from keyboard port 327 and mouse port 329 to local communication device 126. Local communication device 126 then transmits the data over compression link 127. These connections also enable decompression device 323 to receive data from local communication device 126 and transmit the data to video port 325. One skilled in the art will readily appreciate that there are any number of ways to implement such a configuration utilizing a combination of hardware and/or software.

Figure 6A:
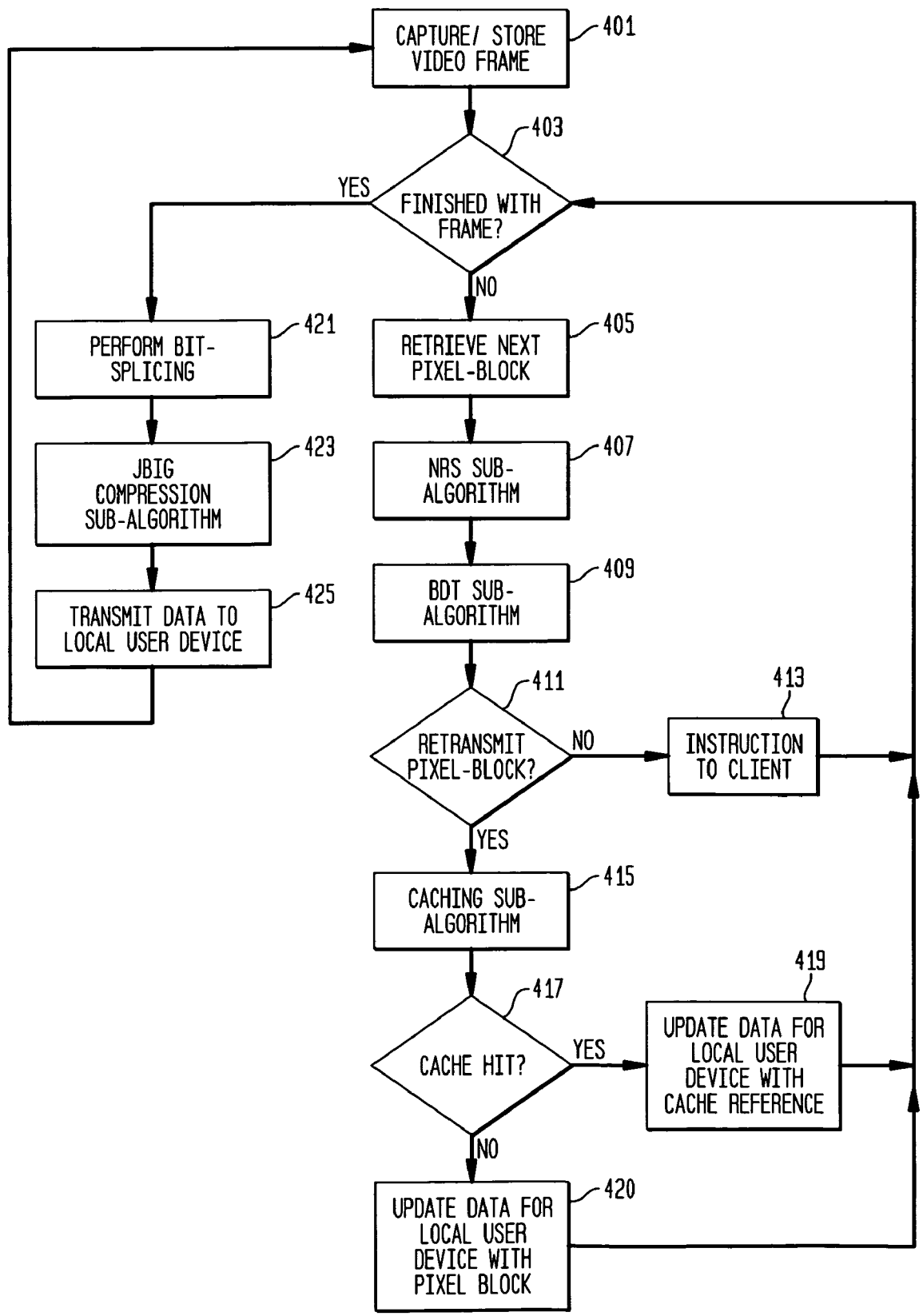
FIG. 6A is a flowchart illustrating an overview of the preferred embodiment of the video signal conditioning, caching, and compression in accordance with the present invention.

Turning now to FIG. 6A, shown is a flowchart illustrating an overview of the video signal conditioning, compression caching algorithm implemented by compression device 103. The algorithm begins by capturing a frame of video from remote computer 101 via monitor connection 105, and storing that frame in a frame buffer (step 401). As described above, this step may involve digitizing the data and storing it in one of multiple video frame buffers. Next, the algorithm performs a series of sub-algorithms that operate on blocks of pixels. As described above, the sub-algorithms that operate on blocks of pixels comprise (1) noise reduction and smoothing, (2) block difference testing, and (3) caching. Although FIG. 6A illustrates these sub-algorithms as operating sequentially, it should be readily understood that these steps may be completed simultaneously (i.e., in parallel), or in a different order than described. This is, in part, one reason for using multiple video buffers.

The video signal conditioning, smoothing and caching sub-algorithms operate on each block of pixels that comprise a video frame until all blocks have been processed by these sub-algorithms (step 403). Each block of pixels is retrieved from video frame buffer (step 405) and filtered according to the noise reduction and smoothing sub-algorithm (step 407) which (1) removes noise induced by the digitization of the video, (2) reduces the number of different colors present in each block by converting less frequently occurring colors to more frequently occurring colors, and (3) converts each pixel to a compact form of representation using a color-code table.

Figure 6B:
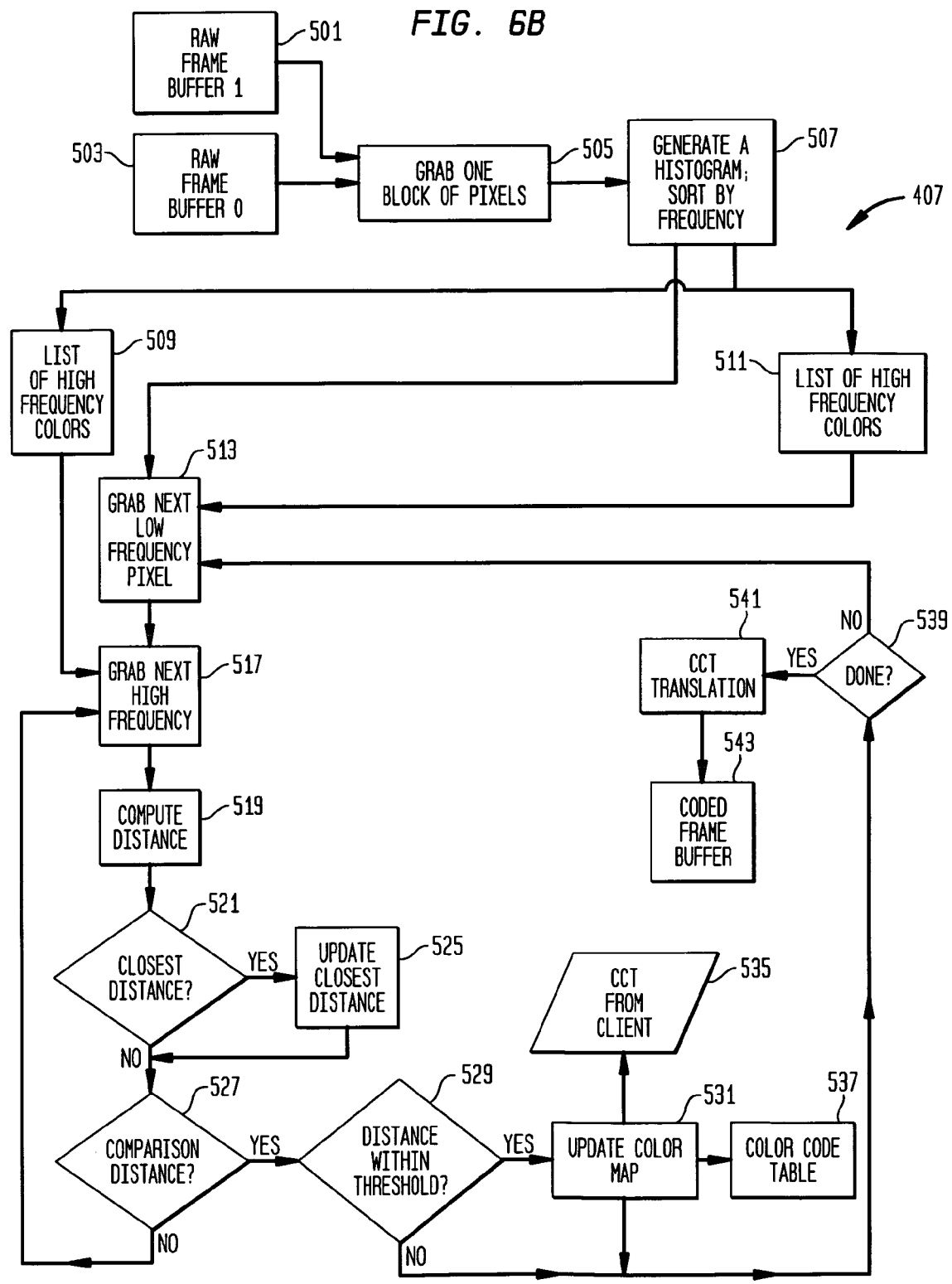
FIG. 6B is a flowchart illustrating the noise reduction and smoothing sub-algorithm shown in FIG. 6A.

Referring now to FIG. 6B, illustrated is the NRS sub-algorithm (step 407 in FIG. 6A). The NRS sub-algorithm selectively converts less frequently occurring colors to more frequently occurring colors by mapping the less frequently occurring colors to the color-coded representation of more frequently occurring colors. The NRS sub-algorithm operates on each block of pixels stored in a frame buffer. To increase the efficiency of the compression device, there is preferably a plurality of frame buffers for storing multiple frames of video. For example, there may be two raw frame buffers, raw frame buffer 1 (501) and raw frame buffer 0 (503) which alternate as the most recently received frame of video from the remote device. Therefore, the first step of the sub-algorithm is to extract a block of pixels from the image stored in either raw frame buffer 0 (503) or raw frame buffer 1 (501) (whichever is most recent) (step 505).

Then, sub-algorithm 407 generates a histogram of pixel values (step 507). The histogram measures the frequency of each pixel value in the extracted block of pixels. The histogram is sorted, such that a list of frequently occurring colors (popular color list 509) and a list of least frequently occurring colors (rare color list 511) are generated. Optionally, the threshold for each list may be adjustable.

Then, each low frequently occurring pixel is analyzed to determine if the pixel should be mapped to a value that occurs often. First, a pixel value is chosen from rare color list 511 (step 513). Then, a pixel value is chosen from popular color list 509 (step 517). The difference between these two values is then computed (step 519). In this process, the distance, D, is a metric computed by comparing the separate red, green and blue values of the two pixels. The distance value D may be computed in a variety of ways. One such example is:

$$D=(R_1-R_2)^2+(G_1-G_2)^2+(B_1-B_2)^2 \quad (1)$$

In this formula, R1 is the red value of the low frequency pixel, R2 is the red value of the high frequency pixel, G1 is the green value of the low frequency pixel, G2 is the green value of the high frequency pixel, B1 is the blue value of the low frequency pixel, and B2 is the blue value of the high frequency pixel.

Formula (1) yields a distance value, D, which indicates the magnitude of the difference of the colors of two pixels. The sub-algorithm then identifies the frequent pixel that is closest in distance to the infrequent pixel. Therefore, sub-algorithm 407 checks each high frequency pixel to see it if is the "closest" in distance to the infrequent pixel (step 521), and updates a closest distance variable (step 525).

Once it is determined that all of the more frequently occurring pixels have been compared to less frequently occurring pixels (step 527), a computation is performed to determine if the lowest occurring D is within a predefined "distance" threshold (step 529). If D is within the predefined threshold, a color code look-up table for the client, client CCT 535, and a color code table for the server, server CCT 537, are updated by mapping the low frequently occurring pixel to the color code value of the high frequently occurring pixel that yielded the distance D (step 531). This process is repeated for all low frequency pixels updating the color code look-up tables appropriately.

Once the distance test is performed for all infrequently occurring pixels (step 539), the block of pixels is mapped to a more compact representation according to the color code translation (step 541) and stored in coded frame buffer 543.

Next, the block difference testing (BDT) sub-algorithm is performed (step 409). This sub-algorithm determines if a block of pixels has changed significantly between successive frames of video by using a unique two-level thresholding technique.

Figure 6C:
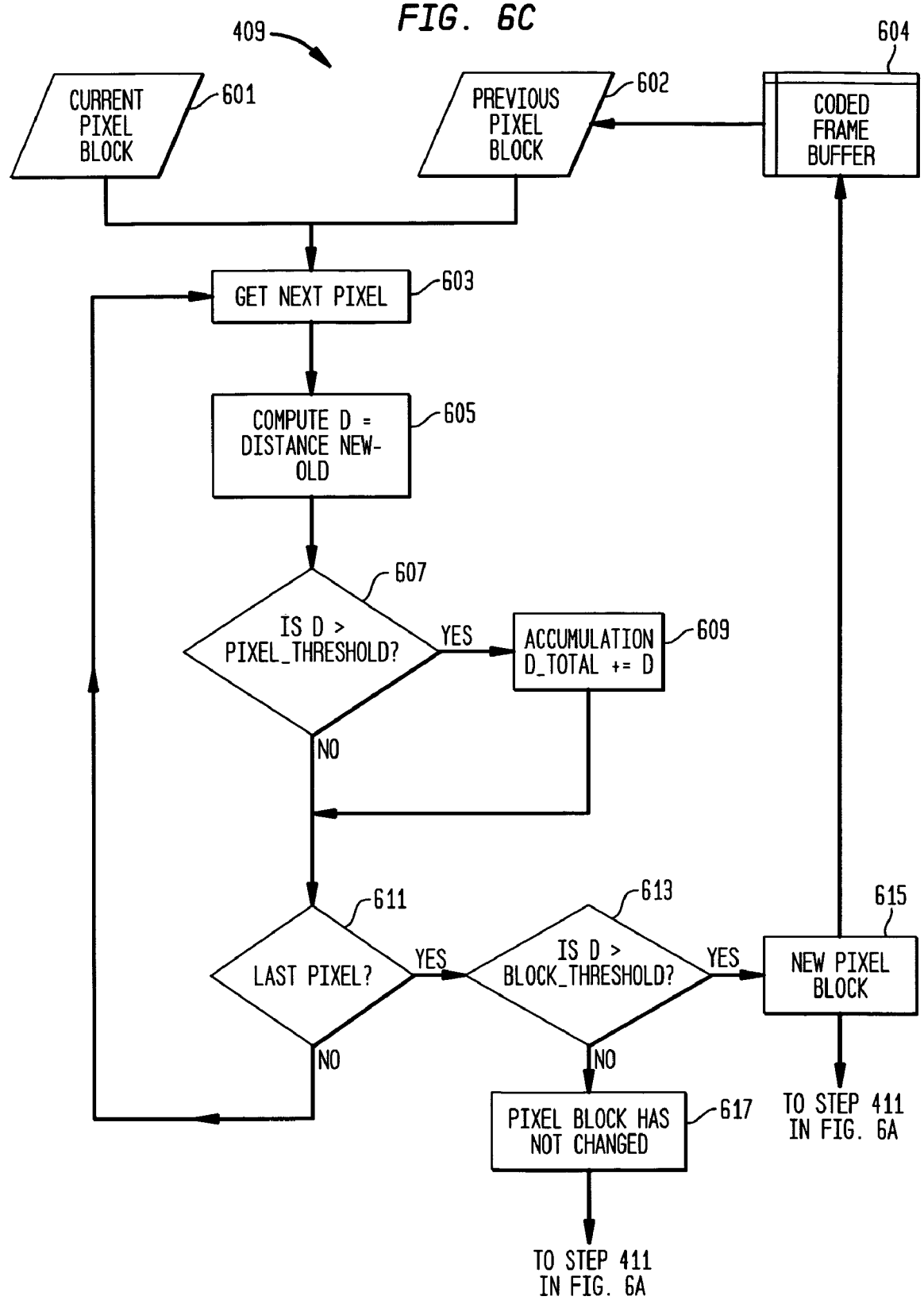
FIG. 6C is a flowchart illustrating the block difference test sub-algorithm shown in FIG. 6A

As shown in FIG. 6C, the BDT sub-algorithm 409 operates on every block of pixels. Current pixel block 601 represents a block of pixels of the video image contained in the current frame buffer (i.e., frame buffer 0 (501) or frame buffer 1 (503) (FIG. 6B)). Previous pixel block 602 contains the corresponding block of pixels of the video image contained in compare frame buffer 604. Block difference test sub-algorithm 409 begins by extracting corresponding pixel values for one pixel from current pixel block 601 and previous pixel block 602 (step 603). Then, the pixel color values are used to calculate a distance value, which indicates the magnitude of the similarity or difference between the colors of the two pixels (step 605). In the preferred, the distance value for a pixel, $P_d$, is computed using the following formula:

$$P_d=(R_1-R_2)^2+(G_1-G_2)^2+(B_1-B_2)^2 \quad (2)$$

As before, R1, G1, and B1 are the red, green and blue values respectively of the frame buffer pixel. Similarly, R2, G2, and B2 are the red, green and blue values respectively for the compare frame buffer pixel.

Next, the computed distance value Pd is compared with a pixel threshold (step 607). If Pd is greater than the pixel threshold, it is added to an accumulating distance sum (step 609). If the value of $P_d$ is less than the pixel threshold, the difference is considered to be insignificant (i.e., noise) and it is not added to the distance sum.

This process of computing distance values and summing distance values that are greater than a predefined pixel threshold continues until it is determined that the last pixel of the block of pixels has been processed (step 611). Once the last pixel is reached, the distance sum is compared with a second threshold, the block threshold (step 613). If the distance sum is greater than the block threshold, the current block of pixels is designated as changed as compared to the corresponding block of pixels from the previously captured frame. Otherwise, if the distance sum is less than the block threshold, the current block of pixels is designated as unchanged.

If the block of pixels is designated as changed, a flag is set that indicates that the particular block of pixels has changed (step 615). Furthermore, the new block of pixels is written to coded frame buffer 604 to replace the corresponding previous block of pixels.

Otherwise, if the distance sum does not exceed the block threshold, the block is designated unchanged and a flag is set to indicate that this block of pixels does not need to be retransmitted to the remote participation equipment (step 617). Rather, the remote participation equipment will recreate the portion of the video image represented by the block of pixels using the same block of pixels displayed for the previous frame of video.

A check is then made to see if the block has changed significantly according to the BDT sub-algorithm (step 411).

If the block has not significantly changed, it is not retransmitted. Instead, only an instruction is sent to the decompression device indicating that the block should not be updated (step 413).

If the BDT sub-algorithm determines that the block should be retransmitted, a second temporal redundancy check (caching) may be performed (step 415). The caching sub-algorithm determines if the block of pixels is found in a memory designated as cache, of recently transmitted pixel blocks. Compression device 103 includes memory, e.g., memory 241, part of which is designed as a "cache" of recently transmitted video frames. Alternatively, a separate memory can be used for the cache.

Figure 6D:
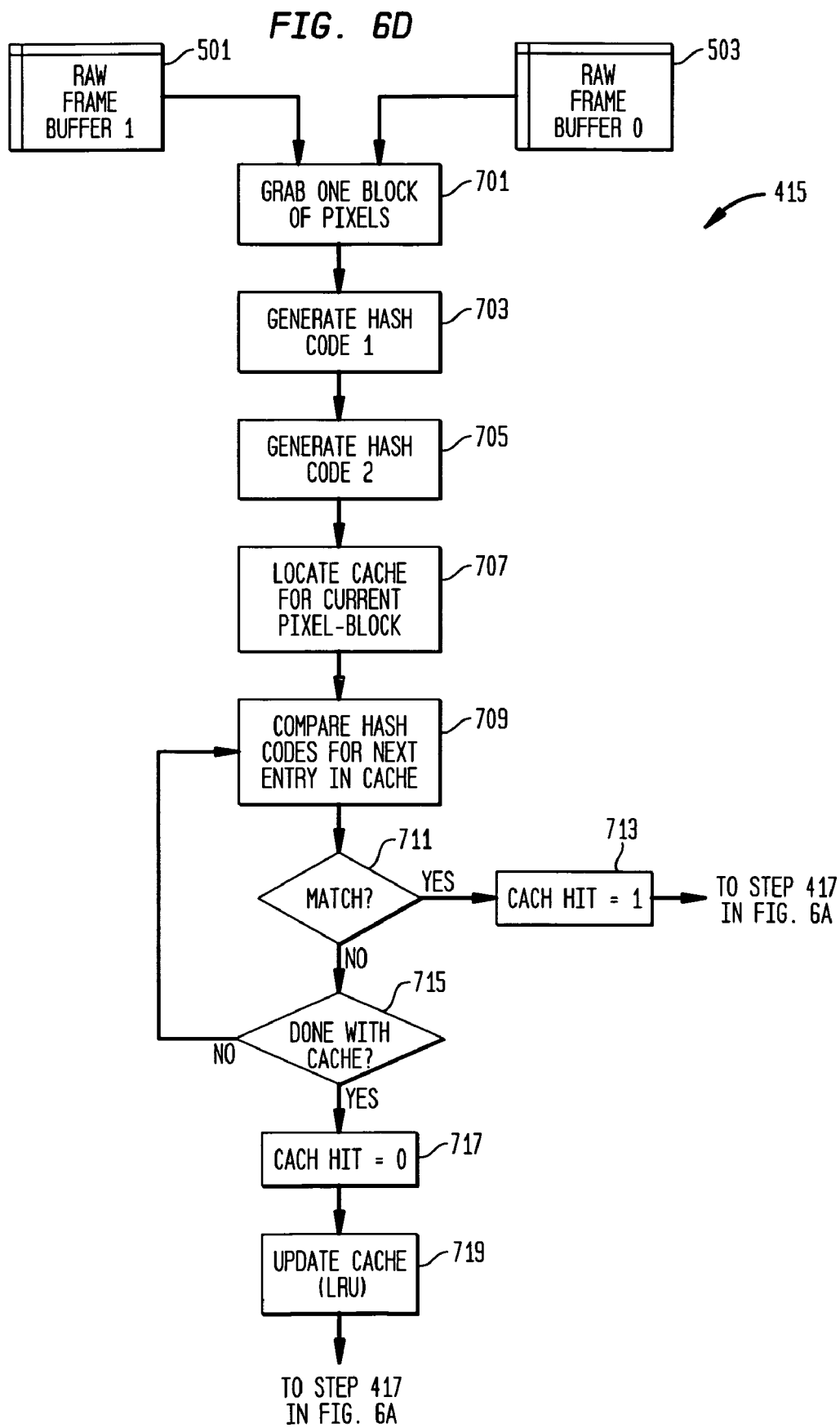
FIG. 6D is a flowchart illustrating the caching sub-algorithm shown in FIG. 6A.

Turning to FIG. 6D, further illustrated is a caching method used by the system of the invention (step 415 in FIG. 6A). Like NRS sub-algorithm 407 and BDT sub-algorithm 409, caching sub-algorithm 415 preferably operates on a block-by-block basis. Therefore, caching sub-algorithm 415 begins by retrieving a pixel-block from one of raw frame buffer 1 (501) or raw frame buffer 0 (503) (step 701).

Next, two hash codes are computed for the block (steps 703 and 705). A hash code function creates a "key" representative of a larger string of data. Because a key is smaller than the string of data it is necessarily not unique for a given string. When the hash function computes identical keys for two non-identical strings, this is called a "collision". Although collisions are unavoidable because there are necessarily less keys than strings, a hash function can be designed that minimizes the probability of collisions. According to the system of the present invention, multiple different hash codes can be computed for a given pixel block of data to further minimize the probability of incorrectly equating two different blocks.

A cyclic redundancy check (CRC) is similar to a hash code function in that it is a number calculated from a block of data. CRC's are traditionally used for error detection. In the invention, a CRC can be used as a basis for comparing two blocks of data, like a hash code. Alternatively, a combination of a hash code and a CRC check can be used, again to severely limit the probability of collisions (i.e., incorrectly identifying two different blocks as equivalent).

Next these computed hash codes are used to determine if the current block of video data is in the cache. As described earlier, the cache of the present invention is preferably implemented in RAM or other memory, and contains a history for each block of pixels that comprise a video frame. Checking for a block of pixels in cache therefore first requires this history to be located for a given frame (step 707). Then, the hash codes of the current block of pixels are compared to the hash codes for each entry in the cache (step 709) until there is a match (step 711), or until the cache is exhausted (step 715). If a match is found, that is an indication that the block is stored in the cache, and a cache hit variable is set to 1 (step 713). If the cache is searched, and the current block is not found, the cache hit variable is set to 0 (step 717). Then the cache is updated with the current block using a replacement algorithm (step 719).

Preferably, the present invention is compatible with any replacement algorithm, but in the preferred embodiment, uses the least recently used ("LRU") algorithm. LRU replaces the portion of cache which has not been used for the longest period of time. Like other parts of the compression and caching algorithm, the LRU preferably operates on a block by block basis (i.e., the depth of history each block preferably is the same). LRU's efficiency is based on the observation that blocks which have been referenced in the recent past will likely be referenced again in the near future. Therefore, it is most likely that the block in cache which has not been used for the longest period of time will not again be used. Thus, replacing this block is likely least detrimental on the performance of the cache. Other caching algorithms can be used in place of the LRU algorithm. For example, the Most Recently Used (MRU) algorithm is also called Fetch-and-Discard replacement algorithm. The Least Frequently Used (LFU) algorithm is another replacement algorithm that replaces the block used least frequently.

Once caching sub-algorithm 415 is complete, bit splicing and JBIG compression are implemented (see FIG. 6A), and the compressed video is transferred to the local user device.

That is, if the block is found in the cache, as determined by step 417, it is not transmitted to the local user workstation. Instead a reference code to the appropriate location within the cache is transmitted (step 419). If the block of pixels is not in the cache, it is included for transmission to the local user (step 420).

The noise reduction, smoothing, and caching sub-algorithms discussed above are performed on all pixel-blocks for a particular video frame until the algorithm determines all pixel-blocks have been processed (step 403). Then, the video data to be transmitted to the server is spliced into bit-frames (step 421), and each bit frame is compressed (step 423). The compressed bit-frames are then transmitted to the client (step 425). Preferably, a JBIG compression algorithm is used to compress each bit-plane.

Referring next to FIG. 7, illustrated is the two level thresholding used by difference test sub-algorithm 409 shown in FIG. 6C. For illustrative purposes only, 4×4 blocks of pixels are shown. Each pixel is given red, green, and blue color values that range from 0 to 255, as is commonly performed in the art. A pixel having red, green, and blue values of 0 represents a black pixel, whereas a pixel having red, green, and blue values of 255 represents a white pixel. Previous pixel block 751 is a block of pixels grabbed from compare frame buffer 521 (FIG. 6C). Previous pixel 1 (752) is the pixel in the upper, left corner of previous pixel block 751. Since every pixel of previous pixel block 751 has a value of 0, previous pixel block 751 represents a 4×4 pixel area that is completely black.

Current pixel block 753 represents the same spatial area of the video frame as previous pixel block 751, but it is one frame later. Here, current pixel 1 (754) is the same pixel 1 as previous pixel 1 (752), but is one frame later. For simplicity, suppose a small white object, such as a white cursor, enters the area of the video image represented by previous pixel block 751. This change occurs in current pixel 1 (754) of current pixel block 753. In current pixel block 753, the majority of the pixels remained black, but current pixel 1 (754) is now white, as represented by the RGB color values of 255, 255, and 255.

Further suppose that noise has been introduced by the A/D conversion, such that previous pixel 755 has changed from black, as represented by its RGB values of 0, 0, and 0, to gray. The new gray color is represented by the RGB values of 2, 2, and 2 assigned to current pixel 756.

Further suppose that the pixel threshold is 100, and the block threshold is 200. Sub-algorithm 409 calculates the distance value between each pixel of current pixel block 753 and previous pixel block 751. The formula used in the preferred embodiment of the present invention, as discussed above with respect to FIG. 6D, is:

$$D=(R_1-R_2)^2+(G_1-G_2)^2+(B_1-B_2)^2 \qquad (3)$$

Therefore, the distance value between current pixel 1 754 and previous pixel 1 (752) is:

$$D=(255-0)^2+(255-0)^2+(255-0)^2 \quad (4)$$

or 195,075. This distance value is added to the distance sum because 195,075 exceeds the pixel threshold of 100. However, the distance value between the black previous pixel 755 and the gray current pixel 756 is not added to the distance sum because the distance between the pixels, as calculated using the above distance formula, equals 12, which does not exceed the pixel threshold of 100. Similarly, the distance value is computed for all of the remaining pixels in the two pixel blocks. Each of these distance values equals zero, therefore, since these distance values are less than the pixel threshold, they are not added to the distance sum.

Consequently, after the distance values for all pixels have been processed, the distance sum equals 195,075. Since this value is greater than the block threshold of 200, the block is designated. This example illustrates the advantages of the two-level thresholding feature of the sub-algorithm. That is, the noise that occurred in current pixel 756 of current pixel block 753 was ignored, whereas the real change in video that occurred in current pixel 1 754 of current pixel block 753 was recognized.

Turning next to FIG. 8, shown is a flowchart of the decompression algorithm executed by decompression device 111 (FIG. 1). The decompression algorithm begins by waiting for a message (step 801) from compression device 103. Thereafter, decompression device 111 receives the information and writes the data to client stack 803. Client stack 803 may be a register or some other device capable of permanently or temporarily storing digital data. In the preferred embodiment, messages are transmitted using the TCP/IP communication protocol. In this scenario, client stack 803 is the local TCP/IP stack. Other embodiments may use a protocol other than TCP/IP. However, irrespective of the communication protocol, the present invention uses client stack 803 to store received messages for processing.

Once a message is received in client stack 803, it is processed to determine whether the message is a new video mode message (step 805). A new video mode message may be sent for a variety of reasons including a bandwidth change, a change in screen resolution or color depth, a new client, etc. This list is not intended to limit the reasons for sending a new video mode message, but instead to give examples of when it may occur. If the message is a new video mode message, application layer 823 is notified of the new video mode (step 807). According to the preferred embodiment, application layer 823 is software executed by decompression device ill that interfaces with the input and output devices of decompression device 111 (i.e., keyboard 115, video monitor 113, and cursor control device 117). Any video updates must therefore be sent to application layer 823. Also, the old buffers are freed, including all memory devoted to storing previously transmitted frames, and new buffers are allocated (step 809). The decompression algorithm then returns to step 801.

If the new message is not a video mode message, the message is further processed to determine if it is a cache hit message (step 811). If yes, the cache hit message is deciphered to determine which block of pixels, of the blocks of pixels stored in the three cache frame buffers 815, should be used to reconstruct the respective portion of the video image. Although three cache frame buffers 815 are used in the preferred embodiment of the present invention, any quantity of cache frame buffers may be used without departing from the spirit of the invention. Cache frame buffers 815 store the same blocks of pixels that are stored in the cache frame buffers located internal to compression device 103. Thus, the cache hit message does not include video data, but rather simply directs the remote participation equipment as to which block of pixels contained in the cache frame buffer 815 should be sent to merge frame buffer 817. The block of pixels contained within the specified cache is then copied from cache frame buffer 815 to merge buffer 817 (step 813). Finally, application layer 823 is notified that an area of the video image has been updated (step 825). Merge buffer 817 contains the current representation of the entire frame of video in color code pixels. Application layer 823 copies the pixel data from merge buffer 817 and formats the data to match the pixel format of the connected video monitor 105 (step 819). Thereafter, the formatted pixel data is written to update frame buffer 821, which then transmits the data to video monitor 113. Alternatively, in lieu of a video monitor, the formatted pixel data may be written to a video card, memory, and/or any other hardware or software commonly used with video display devices.

Further, if the new message is not a new video mode or cache hit message, it is tested to determine if it is a message containing compressed video data (step 827). If the message does not contain compressed video data, the decompression algorithm returns to step 801 and waits for a new message to be transmitted from the server. Otherwise, if the message does contain compressed video data, the data is decompressed and transferred to bit plane frame buffer 833 (step 829). As described above, the preferred embodiment incorporates the JBIG lossless compression technique. Therefore, decompression of the video data must be performed for each individual bit plane. After each bit plane is decompressed, it is merged with previously decompressed bit planes, which are stored in bit plane frame buffer 833 (step 829). When a sufficient number of bit planes have been merged, the merged data contained in bit plane frame buffer 833 is transferred to merge frame buffer 817 (step 831). Alternatively, individual bit planes may be decompressed and stored directly in merge frame buffer 817, thereby eliminating step 831. When all of the data required to display a full frame of video is transferred to merge frame buffer 817, application layer 823 copies the data in merge frame buffer 817 to update frame buffer 821 (step 819). Thereafter, the data is transferred to video monitor 113.

In an alternate embodiment, the video displayed on video monitor 113 can be updated after each bit plane is received. In other words, a user does not have to wait until the whole updated frame of video is received to update portions of the displayed video. This alternative method is desirable when the bandwidth available for video transmission varies. Also, this progressive method of updating the video display is one of the advantages of using the JBIG compression algorithm.

Next, the decompression algorithm determines whether all of the color code data from one field of the current video frame has been received (step 835). If a full field has not been received, the decompression algorithm returns to step 801 and waits for the remainder of the message. Otherwise, if a full field has been received, the decompression method notifies application layer 823 (step 837). Similar to that described above with respect to processing cache hit messages, this notification directs application layer 823 to read the data in merge frame buffer 817 and convert it to the current screen pixel format (step 819). Thereafter, the formatted data is written to update frame buffer 821, which transmits the data to video monitor 113.

After a full field has been received and application layer 823 has been notified, a second determination is made to determine if the full field is the last field included in the message (step 839). If it is, the newly decompressed block of pixels is written to one of the cache frame buffers 815 (step 841). Otherwise, the decompression algorithm returns to step 801 and continues to wait for a new message. Preferably, the new block of pixels written to cache frame buffer 815 overwrites the oldest block of pixels contained therein. Step 841 ensures that the cache is up-to-date and synchronized with the cache of compression device 103. After the completion of the cache update, the decompression algorithm returns to step 801 to wait for another message from the server.

Figure 9:
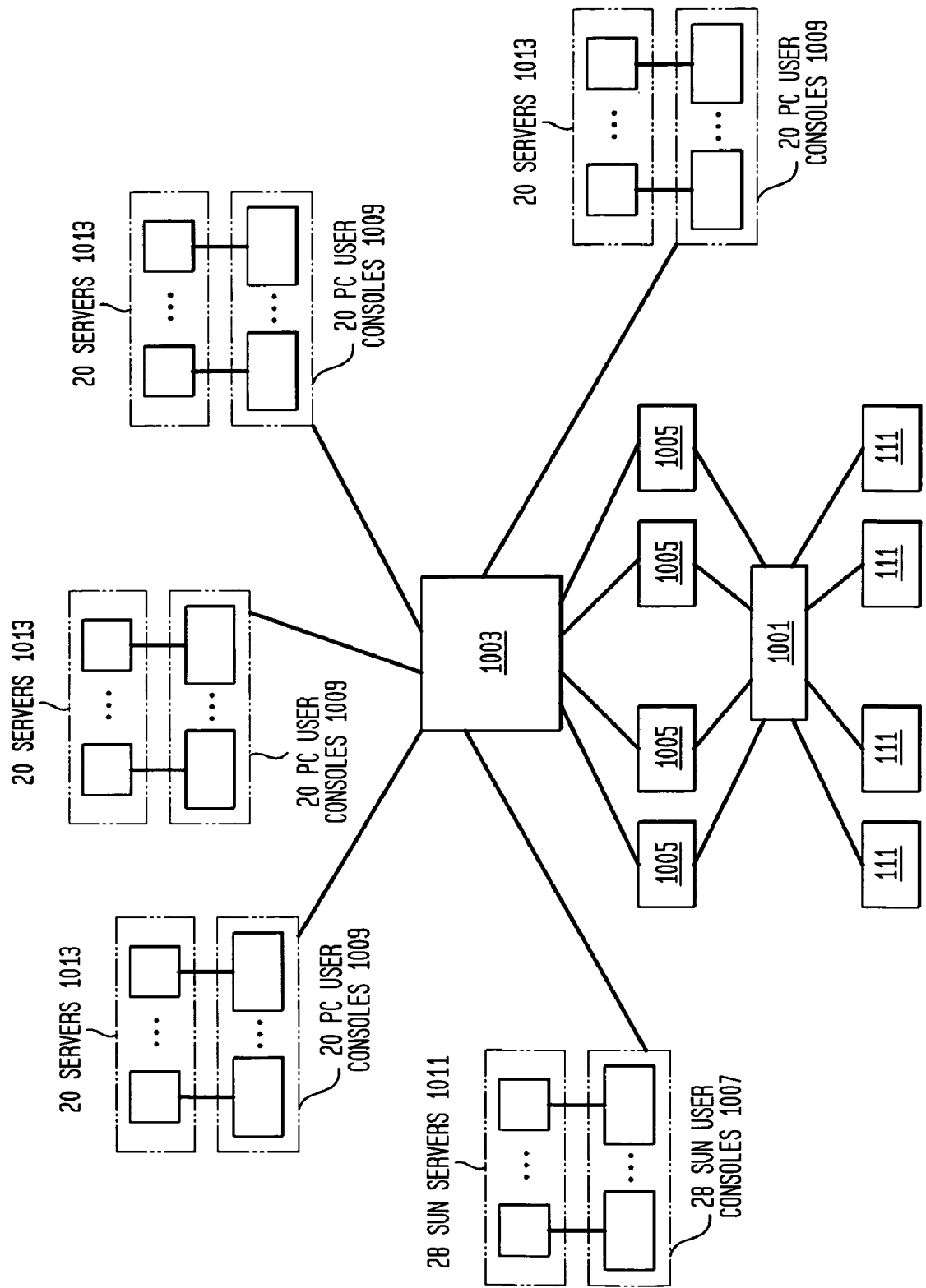
FIG. 9 illustrates an example of an alternate system configuration for implementing the video signal conditioning, caching, compression and decompression in accordance with the present invention in which multiple inputs of four local computers are utilized in conjunction with KVM switches to control remote servers.

Next turn to FIG. 9, illustrated is an alternative embodiment in which the outputs of 4-input 4-output compression switch 1001 are connected to 42 port Paragon KVM switch 1003 via four compression user stations 1005. 4-input 4-output compression switch 1001 utilizes the compression methods of the present invention within a 4-input 4-output KVM switch. 42-port Paragon KVM switch 1003 is a KVM switch with 4 inputs and 42 outputs. In this configuration there can be up to four local computers 111. Each compression user station 1005 receives one output of 4-input 4-output compression switch 1001, and sends the output to the input of 42-port Paragon KVM Switch 1003. Twenty eight outputs from 42-port Paragon KVM Switch 1003 are connected to 28 Sun User Consoles 1007. The remaining outputs of 42-port Paragon KVM Switch 1003 are connected to 20 PC User Consoles 1009. Each Sun User Consol 1007 is connected to a remote sun workstation 1011, while each PC User Console 1009 is connected to a remote PC Server 1013. Thus in this configuration, a compression device, in this case, 4-input 4-output compression switch 1001, can control 108 total servers of which 28 are remote sun workstations 1011, and the other 80 are remote PC Servers 1013.

Figure 10:
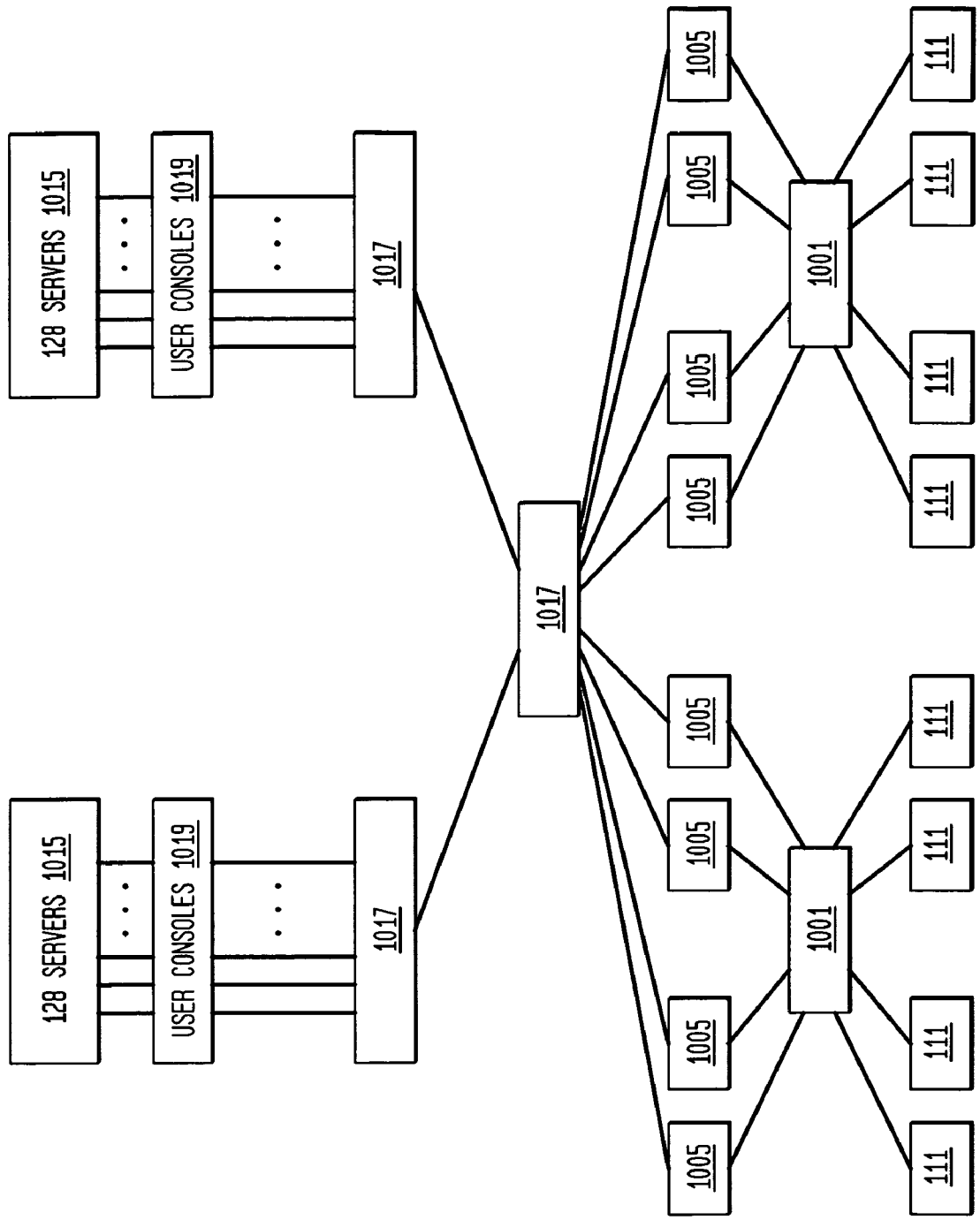
FIG. 10 illustrates another alternate system configuration for implementing the video signal conditioning, caching, compression and decompression in accordance with the present invention in which 8 local computers are capable of controlling 256 servers.

Similarly, FIG. 10 illustrates an alternate configuration of the present invention in which 8 local computers control 256 servers. In this embodiment, three 32-channel KVM switches 1017 are used in a two-level configuration. The first level 32-channel KVM switch 1017 is used as the input to the other two 32-channel KVM switches 1017. As in other arrangements, each remote server 1015 has a user console 1019 that accepts input from 32-channel KVM switch 1017 and converts the input into a readable form for each remote server 1015. As in alternate embodiments, the output from each 4-input, 4-output compression switch 1001 is sent to compression user stations 1005 to convert this output into a form readable by 32-channel KVM switch 1017.

Figure 11:
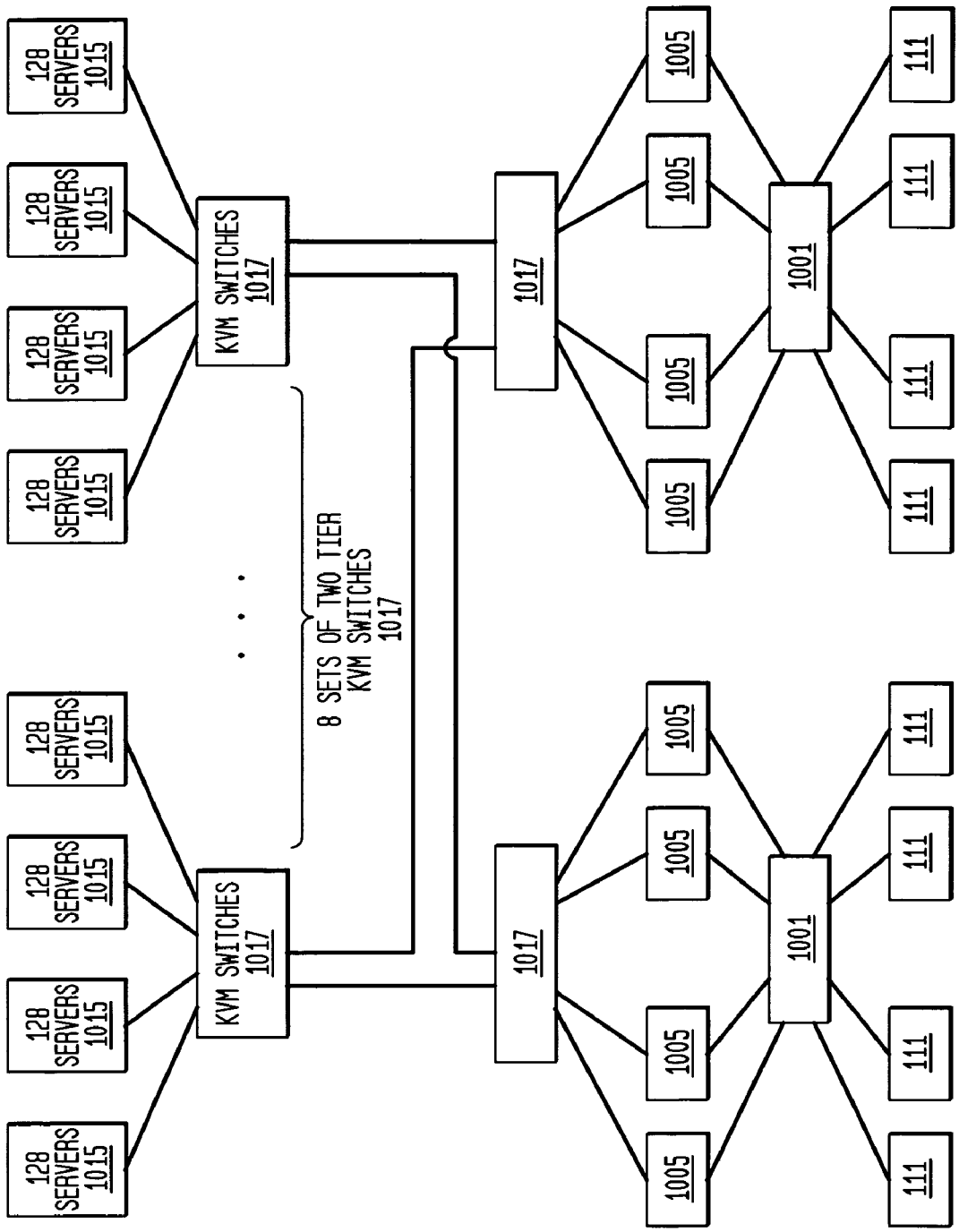
FIG. 11 illustrates yet another alternate system configuration for implementing the video signal conditioning, caching, compression and decompression in accordance with the present invention in which 8 local computers are capable of controlling 1024 servers.

Also, FIG. 11 illustrates an alternate configuration wherein 8 local computers control 1024 remote servers. In this configuration there are two 4-input 4-output compression switches 1001 used in conjunction with three levels of 32-channel KVM switches 1017. In sum, there are 42 32-channel KVM switches 1017. As with other configurations, each remote server 1015 has a user console 1019 capable of accepting input from 32-channel KVM switch 1017, and outputs to remote server 1015. Further, the output from each 4-input 4-output switch 1001 is sent to compression user stations 1005.

Finally, FIG. 12 illustrates an example of an alternate embodiment of the present invention wherein 16 local computers control 256 remote servers. This configuration shows how, with a combination of the present invention and KVM switches, remote computers can be controlled locally, or at the remote location itself. In FIG. 12, there is a 16-input 16-output KVM switch 1021, with inputs connected to a combination of local computers 111, and remote controlling computer 1023. As in other configurations, the local computers 111 connect to the remote servers 1015, via 4-input 4-output compression switch 1001, and compression user station 1005. The outputs of the 16-input 16-output KVM switch are sent to a combination of remote servers 1015, and remote servers 1015 connected to additional 16-input 16-output KVM switches 1021. In total, there are 268 remote servers 1015 that can be controlled by the local computers 111, and the remote controlling computer 1023.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

We claim:

1. A method of transmitting video signals over a keyboard, video and mouse ("KVM") network from one of a plurality of remote computers to one of a plurality of user workstations, said method comprising the steps of:

receiving at least one video signal from a remote computer;
digitizing said video signal;
dividing said digitized video signal into one or more pixel blocks;
comparing said pixel block to a previously stored pixel block;
transmitting an instruction to one of a plurality of the user workstations if the comparing does not exceed a threshold;
generating a code function to be associated with each of said pixel blocks if the comparing exceeds said threshold;
storing said code function in a cache
comparing said generated code function the previously stored code functions in the cache;
storing said pixel blocks in a first cache when the code function does not match any code function in the cache;
transmitting to one of the plurality of user workstations said pixel blocks when the compared code function does not match any code function in said cache; and
updating a second cache with said transmitted pixel blocks.

2. A method according to claim 1, wherein said code function generates at least one hash code for each said pixel block.

3. A method according to claim 1, wherein said code function generates at least one cyclic redundancy check (CRC) code for each said pixel block.

4. A method according to claim 1, wherein said comparing of code functions uses at least a first and second hash code.

5. A method according to claim 1, wherein said comparing of code functions uses at least a first and second CRC code.

6. A method according to claim 1, wherein said comparing of code functions uses at least a hash code and a CRC code.

7. A method according to claim 1, wherein said comparing of code functions continues until a match indicative of a cache hit is found.

8. A method according to claim 7, wherein a reference code is transmitted to said user workstation upon said cache hit.

9. A method according to claim 1, wherein said comparing of code functions continues until comparison has been made to all of said stored code functions in said table.

10. A method according to claim 1, wherein said first and second caches are synchronized.

11. A method of transmitting video signals over a Keyboard, Video, Mouse ("KVM") network from one of a plurality of remote computers to one of a plurality of user workstations, said method comprising the steps of:

receiving at least one video signal from a remote computer;
digitizing said video signal;

dividing said digitized video signal into one or more pixel blocks;

comparing said pixel block to a previously stored pixel block;

transmitting an instruction to one of a plurality of the user workstations if the comparing does not exceed a threshold;

computing at least a first and second hash code for each of said pixel blocks if the comparison exceeds a threshold;

comparing said first and second hash codes to a cache of stored hash codes;

storing said one or more pixel blocks in a cache when said first and second hash codes are not found in the cache of stored hash codes;

transmitting to a user workstation said pixel blocks when said first and second hash codes are not in said cache; and updating a second cache with said transmitted pixel blocks.

12. A method according to claim 11, wherein said hash code comparing continues until a match indicative of a cache hit is found.

13. A method according to claim 12, wherein a reference code is transmitted to said user workstation upon said cache hit.

14. A method according to claim 11, wherein said comparing continues until comparison to all of said hash codes of said stored pixel blocks in said cache has occurred.

15. A method according to claim 11, wherein said first and second caches are synchronized.

16. A keyboard, video, and mouse system for selectively controlling a plurality of remotely located computers from a plurality of local user workstations comprising:

at least one remote computer;

at least one user workstation;

a transformation apparatus for compressing, analyzing and converting at least one video signal from said remote computer;

a first and second frame buffer from said at least one remote computer; and a cache of stored frame buffers;

wherein said transformation apparatus compares said first frame buffer to said second frame buffer by utilizing a first threshold and a second threshold stage and transmits an instruction to at least one user workstations if the comparing does not exceed a threshold;

wherein said transformation apparatus divides said frame buffers into current blocks and generates and stores a plurality of computed codes associated with each current block if the comparing exceeds said threshold, and wherein the transformation apparatus further compares said current blocks to said cache of stored frame buffers using the stored codes and when no match of said current blocks in said frame buffers to said cache of stored frame buffers occurs, the associated blocks are transmitted to the user workstation.

17. A system according to claim 16, wherein said computed codes are hash codes.

18. A system according to claim 16, wherein said computed codes are CRC codes.

19. A system according to claim 16, where said computed codes are a combination of hash codes and CRC codes.

20. A system according to claim 16, wherein a reference code is transmitted to said user workstation upon a match of said current blocks in said frame buffers to said cache of stored frame buffers.

21. A system according to claim 16, wherein said cache is updated upon said current blocks not being found in said cache.

* * * * *